(12) United States Patent
Greene et al.

(10) Patent No.: US 8,880,235 B2
(45) Date of Patent: Nov. 4, 2014

(54) STAGGERING AND FEATHERING OF DEMAND RESPONSE AND ENERGY SUPPLY CHANGE IN A MANAGED ELECTRICAL SYSTEM

(75) Inventors: Daniel H. Greene, Sunnyvale, CA (US); Haitham A. S. Hindi, Menlo Park, CA (US); Robert R. Price, Palo Alto, CA (US); Bryan T. Preas, Battle Ground, WA (US); John Hanley, Emerald Hills, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 427 days.

(21) Appl. No.: 13/296,987

(22) Filed: Nov. 15, 2011

(65) Prior Publication Data

US 2013/0124002 A1    May 16, 2013

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H01H 47/00 | (2006.01) |
| H01H 35/00 | (2006.01) |
| H01H 83/18 | (2006.01) |
| H02H 3/02 | (2006.01) |
| H02H 3/42 | (2006.01) |
| G05B 15/02 | (2006.01) |
| H02J 3/38 | (2006.01) |
| H02J 3/32 | (2006.01) |

(52) U.S. Cl.
CPC .............. *G05B 15/02* (2013.01); *Y04S 10/12* (2013.01); *H02J 3/38* (2013.01); *H02J 3/32* (2013.01); *Y02T 50/54* (2013.01)

USPC ........... 700/296; 700/291; 700/292; 700/297; 307/126

(58) Field of Classification Search
CPC .......... H02J 3/14; H02J 3/28; H02J 2003/12; Y02B 70/3225; Y02B 70/3266; Y04S 20/222; Y04S 20/242
USPC ........ 700/291, 292, 295–297; 307/11, 18–20, 307/112, 116, 125, 126
See application file for complete search history.

(56) References Cited

U.S. PATENT DOCUMENTS

| 5,479,358 | A | * | 12/1995 | Shimoda et al. | 700/291 |
| 8,315,745 | B2 | * | 11/2012 | Creed | 700/295 |
| 2007/0168088 | A1 | * | 7/2007 | Ewing et al. | 700/295 |
| 2010/0087961 | A1 | * | 4/2010 | Velez | 700/292 |

FOREIGN PATENT DOCUMENTS

IN    201101476 I4  *  5/2011

OTHER PUBLICATIONS

Hunt et al., "Unlocking the grid [electricity industry restructuring]", IEEE Spectrum, vol. 33, Issue: 7, 1996, pp. 20-25.*

* cited by examiner

*Primary Examiner* — Crystal J Barnes-Bullock
(74) *Attorney, Agent, or Firm* — Shun Yao; Park, Vaughan, Fleming & Dowler LLP

(57) ABSTRACT

One embodiment of the present invention provides an energy-management system for managing energy within a predominantly closed power system. During operation, the system obtains one or more control actions that control energy transitions of a plurality of components, receives transitional characteristics associated with the components, and schedules the energy transitions by generating a set of offsets. A respective offset results in a delay of at least one energy transition.

15 Claims, 13 Drawing Sheets

STAGGERING AND FEATHERING OF DEMAND RESPONSE AND ENERGY SUPPLY CHANGE IN A MANAGED ELECTRICAL SYSTEM

BACKGROUND

1. Field

The present disclosure relates to power management. More specifically, the present disclosure relates to a method for managing power in a closed electrical system, such as the power system on an aircraft.

2. Related Art

The advent of the More Electric Aircraft (MEA), which relies primarily on the electrical system for its energy needs, creates new opportunities to improve the energy efficiency by optimizing the operation of the electrical system. The primary objective here is to reduce the weight of the aircraft. By far the most significant way this is accomplished is by reducing peak power demands, which dictate the weight of the generator and the wiring size. Although these peak power events are rare, the additional weight they require can be a continuous tax on the primary energy expended in flight.

Various approaches have been considered to improve the "power quality" in an aircraft by regulating the balance of supply and load. However, such regulation is performed on a sub-second scale. An additional energy-optimization solution over a longer time scale is needed.

SUMMARY

One embodiment of the present invention provides an energy-management system for managing energy within a predominantly closed power system. During operation, the system obtains one or more control actions that control energy transitions of a plurality of components, receives transitional characteristics associated with the components, and schedules the energy transitions by generating a set of offsets. A respective offset results in a delay of at least one energy transition.

In a variation on this embodiment, the transitional characteristics associated with a transition include at least one of: amount of power change, a duration time constant, an accuracy figure, and a feathering capability.

In a variation on this embodiment, obtaining the control actions involves performing an optimization based on performance models associated with the components.

In a variation on this embodiment, the system identifies energy transitions that are additive and energy transitions that are subtractive.

In a further variation, scheduling the energy transitions involves scheduling all additive energy transitions ahead of all subtractive energy transitions.

In a further variation, scheduling the energy transitions involves staggering a number of subtractive energy transitions between consecutive additive energy transitions, thereby preventing power imbalance without burdening a short-term power regulation system.

In a variation on this embodiment, the control actions include at least one of: demand response of a load, activation of a source, and energy withdrawal from a storage.

In a variation on this embodiment, the system feathers an energy transition.

DETAILED DESCRIPTION

Figure 1:
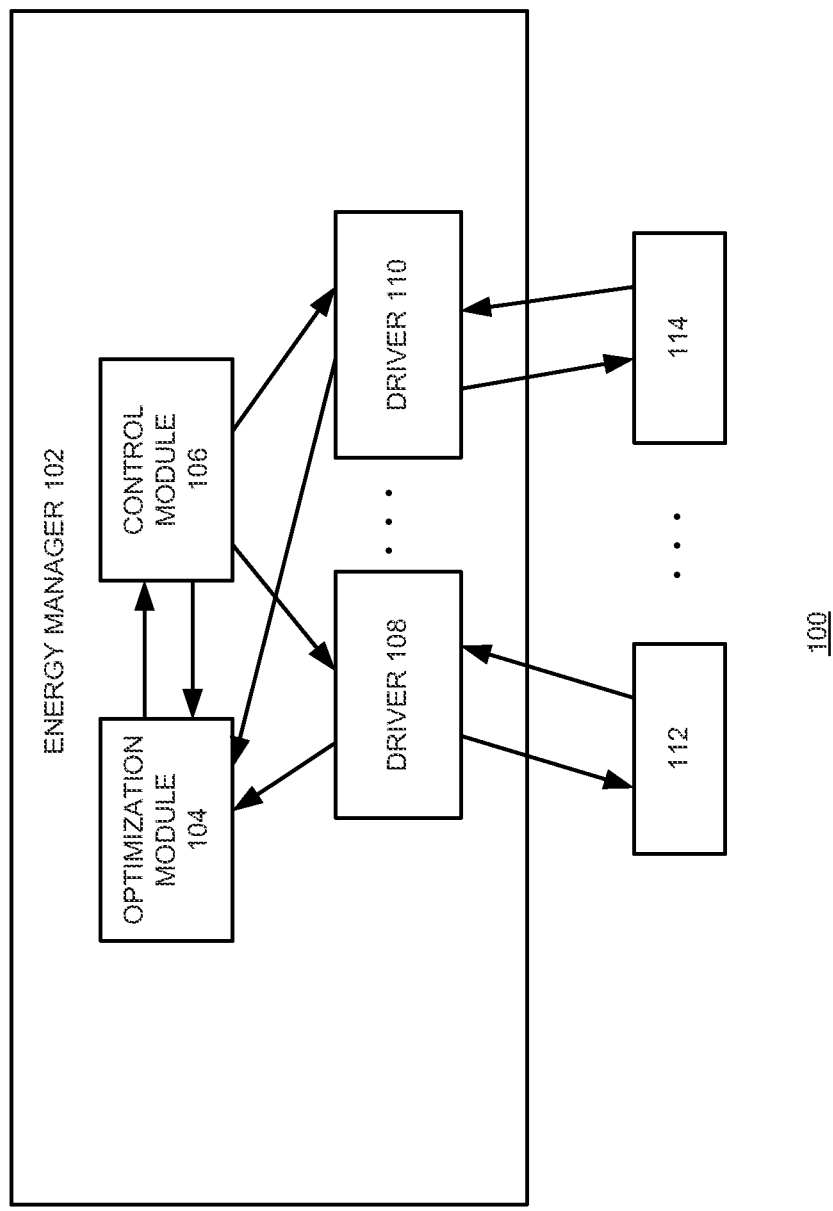
FIG. 1 presents a diagram illustrating the architecture of an exemplary energy-management system for a closed system, in accordance with an embodiment of the present invention.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Overview

Embodiments of the present invention provide a system for optimizing electrical power in a predominantly closed system. The system reduces peak power demand and achieves more steady power consumption by rearranging (in time) the generation and consumption of electrical power. To do so, the system uses a combination of various techniques, including demand response, alternative power supplies, and energy storage. During operation, the system plans future operation of loads and supplies by predicting the operation of the various on-board components and chooses the best way to rearrange future power generation and consumption in order to achieve a combined goal of reducing peak energy need, reducing the cost of power generation, and reducing the disutility caused by modification of normal load operation.

More Electric Aircraft

Traditional aircraft include three types of power systems: the electrical system, the hydraulic system, and the pneumatic system. However, in recent years, the More Electric Aircraft (MEA) has emerged as an alternative to improve efficiency and to achieve lower operating cost. The typical MEA eliminates pneumatic power systems and replaces portions of the hydraulic power systems with compact and efficient electrical power generators and feeders, thus reducing the overall weight of the aircraft and improving energy efficiency. In addition, the dominance of the electrical system in the aircraft also provides improved controllability to the power system.

One important aspect of managing the power system during the flight is to make sure that the amount of power that is available meets the power demand. The amount of generated power and the potential electric load are different during different flight phases. Supply and load must always remain balanced, so if the electrical loads ever exceed the available power, some combination of briefly overloading the generators or load shedding must be used to maintain balance. Embodiments of the present invention use advanced planning to avoid occurrences of such imbalances. For example, the potential for such power imbalance is high during the idle descent phase of the aircraft, during which there is a high electrical demand and a low engine power output. In addition, electrical power needs may surge during certain flight moments which, while infrequent, nevertheless fall within the normal operating range. When heavy icing occurs on the wings of the plane, for example, deicing operations will consume extra electrical power. One approach to addressing the need for extra electrical power may be to use energy storage, such as supercapacitors; or to use additional power sources, such as fuel cells. Another approach is to use load management to reduce the need for electrical power during those critical moments. All or some combinations of these techniques may be used to maintain the available power in excess of demand. The energy management system described here is able to manage all these approaches separately or in combination. The actual configuration of the aircraft, with such components as supercapacitors and/or fuel cells, is a design decision that can be separated from the energy management system. Indeed the ability of the energy management system to do more flexible load control may reduce the need for extra sources of power.

Note that these worst-case power scenarios, such as idle descent and heavy icing, determine the sizes of the generators and wiring within an aircraft, thus greatly impacting the overall weight of the aircraft. An aircraft designer would want to make sure the generator is able to produce enough power to meet the in-flight demand, even during worst-case scenarios. However, excessive power capacity may result in the plane carrying unnecessary weight (due to increased size and weight of the generator and wiring), which increases the everyday operating cost of the aircraft Hence, it is desirable to reduce the power demand during those worst-case scenarios (i.e., reduce peak power demand) in order to reduce the weight of the aircraft.

Embodiments of the present invention provide a power-managing system in an aircraft that is capable of reducing the peak power demand. By using a combination of actions, including asking loads to delay or reduce energy consumption (demand response), on-demand use of alternative energy sources, and using power stored in supercapacitors or hydraulic reservoirs, the system can achieve a smart demand reduction without inconveniencing passengers and staff members.

Energy-Management System Architecture

FIG. 1 presents a diagram illustrating the architecture of an exemplary energy-management system for a closed system, in accordance with an embodiment of the present invention. Energy-management system 100 includes an energy manager 102 and a number of external components, such as components 112 and 114. External components 112 and 114 can be either a power load, such as an oven, or a power supply, such as an engine generator. Energy manager 102 includes an optimization module 104, a control module 106, and a number of component drivers, such as drivers 108 and 110, each interfacing with an external component. For example, driver 108 interfaces with component 112, and driver 110 interfaces with component 114. During operation, optimization module 104 and control module 106 manage or control the energy consummation or production of external components 112 and 114 via component drivers 108 and 110, respectively.

Note that component drivers 108 and 110 provide an interface between optimization/control modules and external components by translating between the component-side protocol and the optimizer-side protocol. Component-side protocol allows drivers to communicate with external components using languages that are specific to each component. A driver for a particular component issues commands specific to the component in order to control its power consumption or production. For example, the protocol used for controlling the Environment Control System (ECS) of an aircraft may includes commands for adjusting the setpoint of the temperature or commands for adjusting the air exchange rate, whereas the protocol used for controlling an oven may include commands for turning on and off the oven. On the other hand, different component drivers communicate with optimization module 104 and control module 106 using a high-level performance model (when it is clear we sometimes use the word "model" to refer to these performance models). In one embodiment this performance model is described with a uniform high-level modeling language. This high-level modeling language models the component's power usage (either consumption or generation) and the costs associated with the load's operation. Because optimization module 104 and control module 106 do not communicate directly with individual external components, they do not need to know the detailed status of the components or execute detailed control of the components. Instead, optimization module 104 and control module 106 only need a high-level model of possible modes of operation of the components and their implication for power optimization. Such a performance model for a component is delivered by its respective component driver to optimization module 104, which performs the optimization. Subsequently, control module 106 returns actions to the component drivers based on the optimization result. The component drivers then instruct individual components to adjust their status accordingly.

Component drivers serve a number of important purposes, including modularity, isolation, restriction, and configuration. By translating between the status and control messages of individual components and a higher-level performance model, the component drivers support the plug-and-play of new components into the energy-management system. These drivers also isolate the energy-management elements (optimization module 104 and control module 106) from irrelevant details (state and control) of each individual component, thus reducing the complexity of the energy-management elements. In addition, these drivers can be configured to "offer" a restricted set of control options to the energy-management elements. Generally these offers deliberately restrict the extent to which the energy-management can manipulate the load. For example, at some point in time, an ECS driver might offer a 20% power reduction for 4 minutes. If the energy-management elements choose this option, then the driver might implement it in the "component-side protocol" by adjusting the temperature upward and letting the temperature rise for 4 minutes. The energy-management elements are not able to directly control the temperature, pressure, or exchange rate of the ECS. Restriction of control allows a load engineer to protect the loads and the consumers of its benefits from arbitrary use of the load for demand response. In terms of configuration, a component's driver is a single point where it is possible to configure the way the component will be used by the energy-management system.

Note that variations of the diagram in FIG. 1 are possible. In addition to having the component drivers collocated with the energy-management elements (i.e., running on the same computer as the energy-management elements) as shown in FIG. 1, it is also possible to place a component driver inside the micro-controller of the component. In addition, although FIG. 1 shows an energy-management system with a centralized energy manager, it is also possible to have a hierarchy of energy managers, where a high-level energy manager controls a number of low-level energy managers, in order to reduce the computational load of a single energy manager.

Component Performance Models

As discussed in the previous section, component drivers communicate with the energy-management elements using a uniform modeling language. On one hand, the modeling language needs to effectively describe the component under control. On the other hand, the modeling language needs to provide simplicity to the energy-management elements. Embodiments of the present invention adopt a modeling language that strikes a good balance between simplicity and expressibility.

Finite state machines are used to describe components, where a model $M^{(j)}$ for component j includes a finite set of states, $S^{(j)}$, and a set of arcs of transitions, $A^{(j)}$, between those states. Depending on the type of component described, the number of states varies and the transition conditions between states are different. However, all component performance models include descriptions of three basic factors at each state as a function of dwelling time. These three basic factors are power, cost, and deficit. In general, they are expressed as linear functions of dwell time $\tau$, as shown below:

$$p_s(\tau) = p_{s,1}\tau + p_{s,0}$$

$$c_s(\tau) = c_{s,1}\tau + c_{s,0}$$

$$d_s(\tau) = c_{s,1}\tau + c_{s,0}. \quad (1)$$

The first function, $p_s(\tau)$, is the power consumed or generated in state s at time $\tau$, it is often a constant dependent on s but independent of $\tau$ (i.e., $p_{s,1}=0$). If the component is a load, $p_s(\tau)$ is negative; if the component is a supply, $p_s(\tau)$ is positive.

The second function, $c_s(\tau)$, is the cost of operating the component in state s at time $\tau$. For supplies, it is the cost of generating the power, which is a rate proportional to the rate of fuel consumed and any variable maintenance that is proportional to time operated in state s. For loads, $c_s(\tau)$ is a measure of "disutility" for any demand response actions taken by the energy-management system. The disutility is zero during normal operation, but if the current state s corresponds to a demand response action, then disutility measures any adverse impact on customers. For example, if the component driver for an ECS offered a 20% power reduction, it would also encode a "disutility" to model the adverse impact of the temperature rise, in order to allow the energy-management system to accurately consider the demand response options available.

The third function, $d_s(\tau)$, is any deficit that the load incurs during operation in state s. For example, if a load is taking a demand response action in state s, such as an ECS letting the temperature rise for a period of time, then the deficit will encode the rate of growth of an energy deficit that needs eventually to be "repaid" in order to return to normal operation. The deficit plays a critical role in the control algorithms, which ensure that the system will always operate in such a way that the deficit could eventually be reduced to zero.

For each component j, there are three global variables, P(t), C(t), and D(t), that integrate power, $p_s$; cost, $c_s$; and deficit, $d_s$, over the states visited by the finite state machine. Let i(t) be a feasible path in the component's finite state machine, $i(t) \in S$. Then, at time t, in state i(t), there are equations:

$$\frac{\partial P(i,t)}{\partial t} = p_{i(t)}(\tau(i,t)), \quad P(0) = 0 \quad (2)$$

$$\frac{\partial C(i,t)}{\partial t} = c_{i(t)}(\tau(i,t)), \quad C(0) = 0$$

$$\frac{\partial D(i,t)}{\partial t} = d_{i(t)}(\tau(i,t)), \quad D(0) = 0.$$

Note that in Eq. (2) the Roman letter t stands for the elapsed time since the beginning of the scenario, and the Greek letter $\tau$ stands for the dwell time in the current state. The dwell time $\tau(i,t)$ depends on the path through the finite state machine i and the elapsed time t. Note that the dwell time $\tau$ is reset at each state transition.

The arcs ($a \in A$) between states in the model are denoted using a triple $\{s_1, s_2, \text{trigger}\}$, where $s_1$ is the current state, $s_2$ is the next state, and trigger is the condition causing the transition from $s_1$ to $s_2$. Note that there are two kinds of arcs, "mandatory" and "optional." Mandatory arcs have simple trigger conditions dependent on either the dwell time $\tau$ in the current state $s_1$ or the cumulative deficit D(t). Three kinds of trigger conditions are adequate to build most models: $\tau > \tau_{max}$, $D(t) > D_{max}$, and $D(t) < D_{min}$, where $\tau_{max}$, $D_{max}$, and $D_{min}$ are constants specified by the driver composing the model. A mandatory arc means that a transition to a new state is triggered when the condition is met. When a driver delivers a model including a mandatory arc to the energy manager, it is advising the energy manager of an anticipated change in the operation of the component. For example, a mandatory arc might occur after a component, such as a fuel cell, has warmed up and begins normal operation. Optional arcs are state transitions that the energy-management element may choose, and they correspond to control actions. A trigger condition for an optional arc can be expressed as u="option name," where u stands for control inputs. In one embodiment, u can be a discrete variable from an enumerated type that uniquely identifies an optional transition out of state $s_1$. When a driver delivers a model including an optional arc, the driver is "offering" a control action to the energy manager. If the model reaches state $s_1$ from which the optional arc emanates, then the energy manager can invoke the option by returning the label of the optional arc to the driver. Subsequently, the driver implements the action by sending component-specific commands to the component.

In the embodiment described here the performance models are described using a form of hybrid system modeling, where certain restrictions are made, such as: the uniform use of P, C, and D variables, the use of linear forms in Eq. (1), and the limited kinds of allowed mandatory transitions. These kinds of restrictions make subsequent optimization and control more computationally efficient. Even with these restrictions the modeling language is very expressive, it is still able to describe a variety of kinds of loads and supplies, as will be illustrated in the next three figures. It will be understood to one skilled in the art that some modifications to the modeling language (e.g., adding new kinds of mandatory transitions or additional time variables) may be possible while retaining the essential benefits of this invention.

Figure 2:
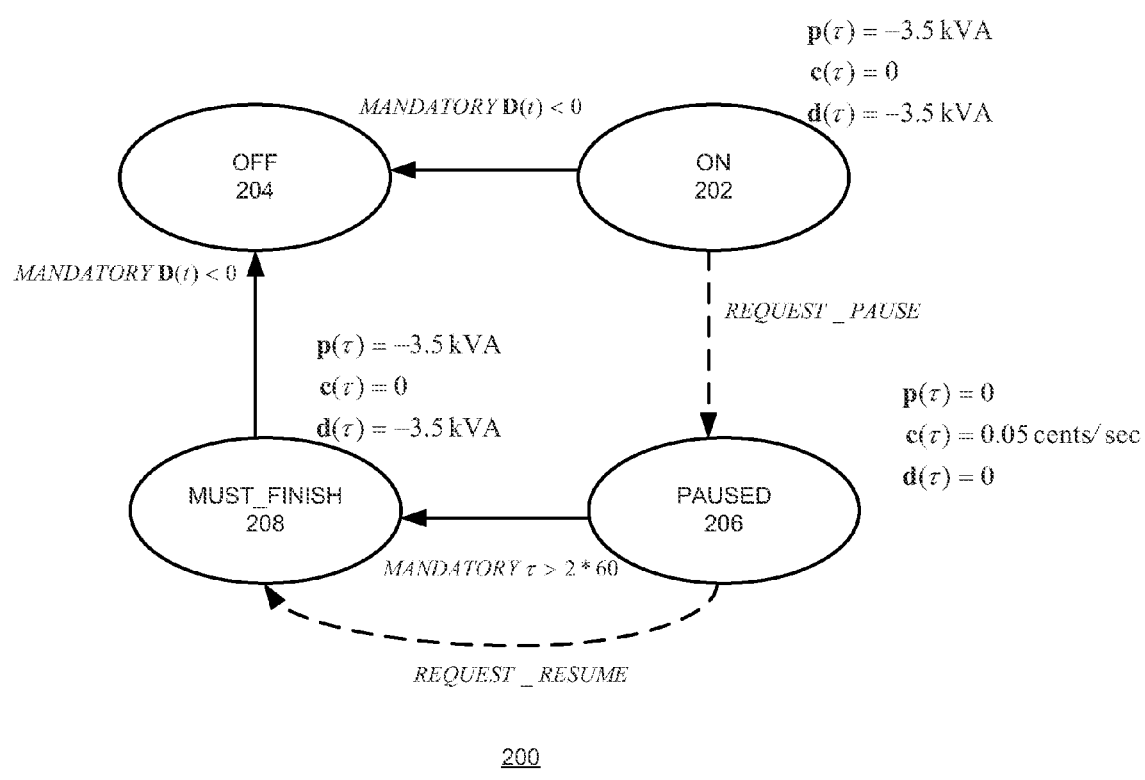
FIG. 2 presents a diagram illustrating an exemplary performance model for an oven, in accordance with an embodiment of the present invention.

FIG. 2 presents a diagram illustrating an exemplary model for an oven, in accordance with an embodiment of the present invention. In FIG. 2, state machine 200 includes four states, an "ON" state 202, an "OFF" state 204, a "PAUSED" state 206, and a "MUST_FINISH" state 208. In each state there are three equations controlling the rate of change of the P, C, and D variables (when they are omitted they are assumed to be zero, e.g., the "OFF" state 204). The arcs in solid lines are mandatory, and the arcs in dashed lines are optional.

During operation, when a user starts the oven, the driver for the oven computes the deficit, which reflects the amount of energy needed in order to complete the current user-requested cooking time. The driver then delivers the model shown in FIG. 2 to the energy manager, and indicates that the current state is "ON" state 202. Note that a mandatory transition to "OFF" state 204 occurs when the deficit is less than 0 (i.e., the cooking is complete). In this model, the driver has "offered" a demand response option to the energy-management elements, which is to allow the oven to pause operation once, for at most two minutes. The energy manager can choose this offer by selecting the optional arc between "ON" state 202 and "PAUSED" state 206. Note that a mandatory transition to "MUST_FINISH" state 208 occurs after 2 minutes, meaning that the oven can at most delay cooking by 2 minutes. The MUST_FINISH state also ensures that only one pause is allowed during cooking Note that if the energy-management elements invoke this demand response, a cost will be incurred, in this case a disutility, proportional to the length of the delay. This cost is illustrated as $c(\tau)=0.05$ cents/sec in "PAUSED" state 206.

The exemplary demand response illustrated in FIG. 2 is a single brief pause of at most two minutes. It is understood that the driver may use the same modeling language to express a variety of different demand response offerings, such as multiple brief pauses, or pauses allowable only before the start of cooking. The programming of the driver is an engineering design choice to be made based on considerations of the impact of demand response on the load's operation.

As seen in FIG. 2, cost is tracked in the component performance models. Each state s has a cost rate variable $c_s(\tau)$ and the total cost is integrated in a global variable C(t) for the component. For power supplies, drivers can assign this cost in the models delivered to the energy-management elements by considering the cost of the fuel required to generate the power and any variable maintenance costs (e.g., service required based on hours of operation). Loads do not normally directly incur costs, but instead their power costs will be accounted for in the models of components that generate the power.

However, when the energy manager uses loads for demand response, loads will incur costs, which are referred as "disutilities." See, for example, the $c(\tau)=0.05$ cents/sec in "PAUSED" state 206. The disutility can be a dollar valuation assigned to the discomfort to passengers and crew members, such as discomfort caused by raised cabin temperature, due to the demand response actions. Unlike fuel costs, which are easy to determine, these disutilities may be subjective, and hard to assign a value to, especially since they lump together the impact of demand response on multiple individual passengers and crew members. In the models, these disutility costs are used as natural parameters to allow load engineers to tune the availability of the load for demand response, and thereby, tune the choice of which loads will be used for demand response.

The use of the term "disutility" reflects its relationship to the concept of "utility" as used in economics. Under the current context, the sign has been changed so that all components, including loads and supplies, have positive costs, and the origin has been moved so that normal operation has a "disutility" of zero. For energy management it is the relative change in utility that is import; arriving at absolute utilities would add unnecessary burden and potential noise in the configuration of the drivers.

Economists define continuous utility as a unit-less scalar to recognize that dollar values are arrived at separately and may not coincide directly with the consumer's utility. For simplicity, in these models, load engineers can use dollar units to directly encode their best understanding of the disutility into the drivers' models (i.e., we assume they do not participate in markets or otherwise strategize their assignment of disutility).

In the component performance model, each state includes a rate of deficit increase or reduction, $d_s(\tau)$, and a cumulative deficit is computed over the states visited: D(t). The deficit is usually accrued during a demand response action. It represents energy which must be expended to return the system to normal operation. For example, if the ECS has let the temperature rise 1 degree, then extra energy must be spent to return the environment to the normal temperature. The driver for the ECS uses the deficit variables in the ECS component performance model to advise the energy-management elements of this consequence of the demand response action. In this way, the deficit will prove critical to the energy-management elements' control and optimization algorithms.

In addition to expressing the temporary consequences of the demand response action, the component performance models also use the deficit to encode the predicted energy consumption during a requested operation. For example, in the oven model shown in FIG. 2, when the oven is turned on, the driver estimates the total energy consumption for the operation of the oven (e.g., cooking for 2 minutes), and encodes this as the initial deficit D(0) in the model sent to the energy-management element. In this example, a running oven (in the "ON" state) reduces this deficit at a steady rate, while a demand response action (in the "PAUSED" state) stalls the deficit reduction. This can be interpreted as recognizing "OFF" as the normal, deficit zero, situation for an oven.

The deficit can also be used to model energy storage devices such as supercapacitors. In this case, deficit zero can be assigned to the current target for the energy stored in the capacitor; then, any draining or charging of the capacitor can be reflected in positive or negative deficit rates. When performing optimization, it is critical to account for the deficit; otherwise certain solutions involving heavy demand response, or discharging capacitors, will seem superficially better because they avoid more costly energy generation.

Figure 3A:
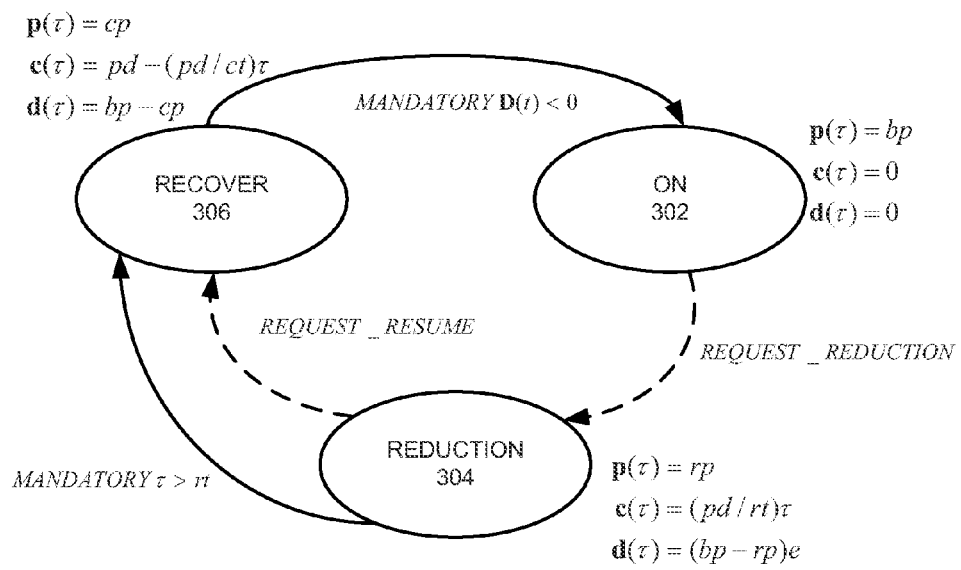
FIG. 3A presents a diagram illustrating an exemplary performance model for an Environment control System (ECS), in accordance with an embodiment of the present invention.

FIG. 3A presents a diagram illustrating an exemplary model for an ECS, in accordance with an embodiment of the present invention. In FIG. 3A, state machine 300 includes three states, an "ON" state 302, a "REDUCTION" state 304, and a "RECOVER" state 306. The three parameters (power, cost, and deficit) are listed for each state. The arcs in solid lines are mandatory, and the arcs in dashed lines are optional. In the model shown in FIG. 3A, the driver for the ECS offers the possibility of a brief reduction in power consumed (the reduction time must be less than the constant rt). The driver expects to achieve this reduction by reducing the air conditioning portion of the ECS. Note that the model shown in FIG. 3A does not describe how the reduction will occur, just its consequences in power, disutility, and deficit. If the energy-management elements request a reduction, the driver knows that during the reduction the temperature will rise and there will be a slight discomfort to passengers and staff. The constants used in the models, such as pd, rp, rt, cp, ct, bp, and e are further explained in FIG. 3B.

Figure 3B:
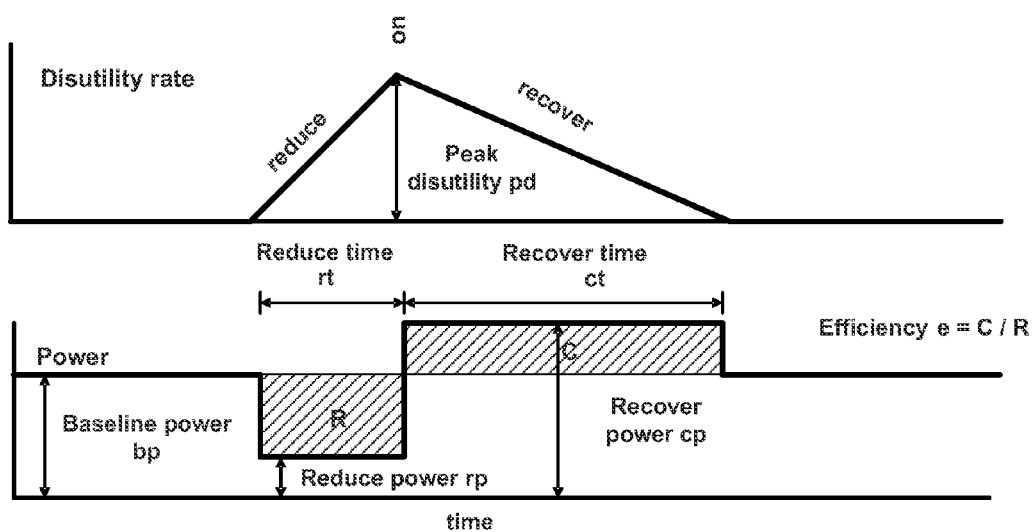
FIG. 3B presents a diagram illustrating the disutility rate and power as a function of time for an ECS model, in accordance with an embodiment of the present invention.

FIG. 3B presents a diagram illustrating the disutility rate and power as a function of time for an ECS model, in accordance with an embodiment of the present invention. From FIG. 3B, one can see that as the ECS reduces power, the disutility rate (the discomfort to customers and staff) ramps up. Note that although the temperature rise may not be linear, the driver has approximated this effect with a linear function. Enhanced fidelity to a non-linear temperature rise could be represented by multiple reduction states that would produce a piecewise linear curve, but this does not appear to be necessary. The driver also knows the amount of time and power consumed during recovery; these are shown in the lower portion of FIG. 3B.

Note that FIG. 3A illustrates just one of several possible models that the ECS driver might offer to the energy manager. Other alternatives include: offering a power reduction based on reducing the air exchange rate, which will also decrease the air-conditioning load; and offering multiple levels of power reduction with different disutility rates, all within the same model offered to the energy manager. The driver itself must have a more detailed model of the operation of the ECS to know how altitude, outside temperature, and airspeed will affect the operation of the ECS, and how any demand response actions will change the operation of the ECS. However, this detailed model will be used to construct a simplified model, such as FIG. 3A, to offer to the energy manager. It is desirable that models offered by the drivers be relatively simple, containing few states (i.e., fewer than 15), and offering few choices to the energy manager. Complex models would cause computational difficulties for the optimization algorithms, and may not significantly improve the control. The drivers will offer these models frequently to the energy-management elements, with an opportunity to revise them before every planning cycle (e.g., every 20 seconds). As a consequence, even though the models are offering demand response opportunities that extend over several minutes, any inaccuracies can be remedied within a few seconds. For example, any inaccuracies due to linear approximations, such as those shown in FIG. 3B, would be remedied quickly.

Figure 4:
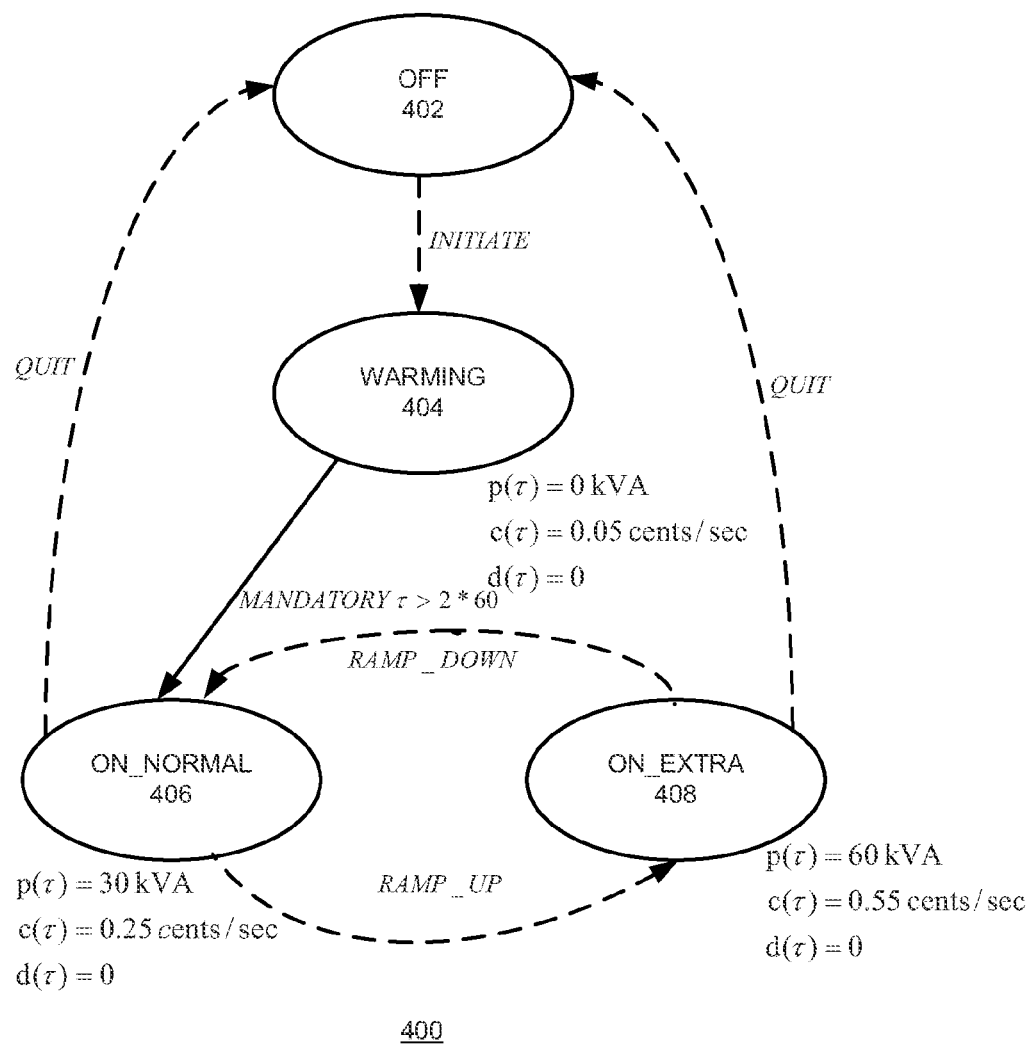
FIG. 4 presents a diagram illustrating an exemplary performance model for a fuel cell, in accordance with an embodiment of the present invention.

FIG. 4 presents a diagram illustrating an exemplary model for a fuel cell, in accordance with an embodiment of the present invention. In FIG. 4, state machine 400 includes four states, an "OFF" state 402, a "WARMING" state 404, an "ON_NORMAL" state 406, and an "ON_EXTRA" state 408. The three parameters (power, cost, and deficit) are listed for each state, except "OFF" state 402. The arcs in solid lines are mandatory, and the arcs in dashed lines are optional.

There are several technologies that might be used in fuel cells on aircraft (e.g., solid oxide or hydrogen). This model includes some of the issues associated with fuel cells, although the actual parameters could differ significantly among types of fuel cells. For example, higher temperature fuel cells, such as solid-oxide fuel cells require warm-up before they can generate power. FIG. 4 includes a warm-up state ("WARMING" state 404) that the driver uses to advise the energy manager of the delay (i.e., in the model illustrated, the driver advises the energy manager that if it requests the "initiate" option, it will receive power in two minutes (as illustrated by the mandatory transition from "WARMING" state 404 to "ON_NORMAL" state 406. In addition, most fuel cells support a range of power output levels. It is usually possible to generate more power, but with significantly more wear on the fuel cell. This can be advantageous in dealing with peak power demands on the aircraft, but may not be desirable for normal operation. This is reflected in the model in FIG. 4 by two "ON" states, "ON_NORMAL" state 406 and "ON_EXTRA" state 408. Note that "ON_EXTRA" state 408 has the additional cost of maintenance incorporated in its $c(\tau)$ function.

From FIG. 4, one can see that the same uniform modeling language used for loads can also be used for supplies, with the principle difference being the source of the cost function. For supplies the cost is fuel plus variable maintenance, whereas for loads it is disutility. Supplies also have an additional parameter that describes how they can be regulated at the sub-second level for power quality. In the model shown in FIG. 4, when the energy manager has placed the fuel cell in "ON_NORMAL" state 406 with maximum power output of 30 kVA, the sub-second regulation may control the output between 0 and 30 kVA to precisely balance load and supply.

The exemplary models shown in FIGS. 2, 3A, and 4 illustrate the key advantages of an architecture using drivers with a model-language protocol. First, the drivers support the plug-and-play of new components by describing the component in the model. Second, the drivers provide "isolation" to the energy-management elements by isolating it from irrelevant details (state and control) of the component. For example, in the oven model shown in FIG. 2, the energy manager can invoke a demand response by selecting the "request pause" optional transition. The energy manager only knows about the power consequences, not how to implement this action (the driver implements the action). Third, the restricted set of control options "offered" by the drivers to the energy-management elements restrict the ability of the energy-management elements to make arbitrary changes to the component. For example, in the oven model shown in FIG. 2, the driver only "offers" a less than two-minute delay in cooking Fourth, a component's driver is a single point where it is possible to configure the way the component will be used by the energy-management system. Here is where the magnitude of the disutility can be adjusted to influence how likely the energy-management system will be to invoke demand response actions, such as pausing the oven. Higher disutility will cause the energy manager to favor alternative choices for demand response actions, or to use more expensive energy supplies instead of demand response.

Model Predictive Control Scheme

To manage energy consumption, in one embodiment, a model predictive control (MPC) scheme is formed. Model predictive control relies on models to predict the future operation of the system over a finite horizon. Optimization is used to find the best control plan over the entire finite horizon, and then the first step in this plan is used as an immediate next control action. The entire plan is seldom executed; instead, the horizon is advanced one time step at a time and the optimization is repeated at each time step. Note that, while we refer to this as MPC, this approach differs from most typical MPC applications; we are optimizing operations of the loads rather than tracking a signal, and for robustness we will in some cases predict the worst-case operation of a load, rather than the most likely operation. Also note that most MPC approaches are built heavily on linear and piecewise linear system theory, as well as linear and quadratic programming. However, in this energy management application, the demand response actions and the activation of additional energy sources are operational changes which are inherently non-linear and discrete in nature.

When applying model predictive control to this problem, there is a significant technical issue: how to terminate the optimization at the end of the finite horizon. In embodiments of the present invention, the "deficit" parameter in the component performance models is used by the MPC scheme: the optimization finds the best control plan that reduces all the component deficits to zero at the end of the finite horizon. However, because the MPC scheme usually executes only the first step of its optimal plan (before moving the horizon forward by one time step and repeating the optimization), it may be that the controller never reduces the deficit to zero.

Requiring that the optimization reduce the deficit to zero serves two purposes. First, it allows for fair comparison of control strategies involving demand response. If some control strategies were able to leave a deficit at the end of the horizon, they would look artificially better because of avoided power generation. Second, it enforces a more conservative use of demand response, because control actions are only taken along plans that could, in principle, reduce the deficit to zero and restore the system to normal operation. This can also be understood with a banking analogy: bankers will usually not loan money without evidence that the debt can be repaid (i.e., the deficit is reduced to zero). However, over longer periods of time bankers will allow some of their customers to be continuously in debt.

The zero-deficit requirement can be implemented in the modeling language described earlier by using, in each component performance model, one or more terminal states that are entered on the trigger condition $D(t)<0$. The optimization finds the best control plan where all the models are in their terminal states at the end of the time horizon (i.e., at $t=T$). Alternatively, the zero-deficit requirement can be relaxed by allowing the models to enter their terminal states with non-zero deficits, but penalizing non-zero deficits at the end of the horizon according to:

$$Terminate(D(i,T)) = \begin{cases} \alpha MD(i,T) & \text{if } D(i,T) \geq 0 \\ \frac{1}{\alpha} MD(i,T) & \text{if } D(i,T) < 0, \end{cases} \quad (3)$$

where the penalty is applied at the end of the optimization horizon, T, and includes an exaggeration factor $a>1$ of the typical cost of generating energy, M, to discourage, but not strictly prohibit, leaving a non-zero deficit. This relaxation will be necessary if a component's operation time-scale exceeds the planning horizon.

Within the MPC there is an optimization over a finite horizon. To define this optimization problem over multiple components, superscript (j) is added to the above notations to indicate component j. Let $i^{(j)}(t)$ represent a feasible path through the finite state machine for component j, and $I^{(j)}$ for the set of all such feasible paths. The optimization problem is to find an optimal ensemble of feasible paths $i^{(j)}(t)$, one for each of the components, so as to:

$$\text{minimize } \Sigma_j C^{(j)}(i^{(j)},T)(\text{cost}) \quad (4)$$

subject to:

$$\forall_t \Sigma_j P_{i^{(j)}(t)}^{(j)}(\tau(i^{(j)},t)) > 0 \text{ (continuous adequate power)}$$

$$\forall_j D^{(j)}(i^{(j)},T) = 0 \text{ (deficits zero at the end of the horizon)}$$

$$\forall_j i^{(j)} \in I^{(j)} \text{(feasible paths)}$$

$$\forall_j i^{(j)}(0) = i_0^{(j)} \text{(initial conditions)}. \quad (5)$$

Note that this problem can be viewed as a shortest path problem in the multidimensional space of ensembles of paths. Specifically, a search is performed for the least cost path from the initial conditions to terminal states with zero deficit, amongst power adequate ensembles of paths, over the time horizon from $t=0$ to $t=T$.

This optimization problem is the most computationally challenging portion of the energy-management system. Different approaches can be used to compute an optimal plan within the plan horizon, that is, to solve the optimization in Eq. (4) subject to Eq. (5). Note that, although here Eq. (5) is expressed as the constraint for minimizing Eq. (4), it is possible to include one or more conditions in Eq. (5) as additional terms in the function to be minimized. In addition to finding the exact solution, it is also possible to include an option to stop computing earlier with the best solution at hand. It is also possible to use heuristic solutions to the optimization problem, which are faster but less optimal than solving Eq. (4) subject to Eq. (5).

A* Search Algorithm

Different approaches can be used to solve the optimization problems expressed by Eqs. (4) and (5). In one embodiment of the present invention, the optimization algorithm adopts an A* search scheme. This optimization approach converts the optimization to a graph search problem. For each component, the finite state machine describing the component performance model is converted to a graph. Time is quantized, where a bold t indicates time steps $t=0, 1, 2, 3, \ldots$, so the continuous time t changes in discrete steps as $t=t\delta t$. The continuous quantities $\tau$ and $D(t)$ used in the trigger conditions are also quantized, and extra nodes are included in the graph to represent the state of the quantized variables to eliminate trigger conditions on the edges in the graph.

Figure 5:
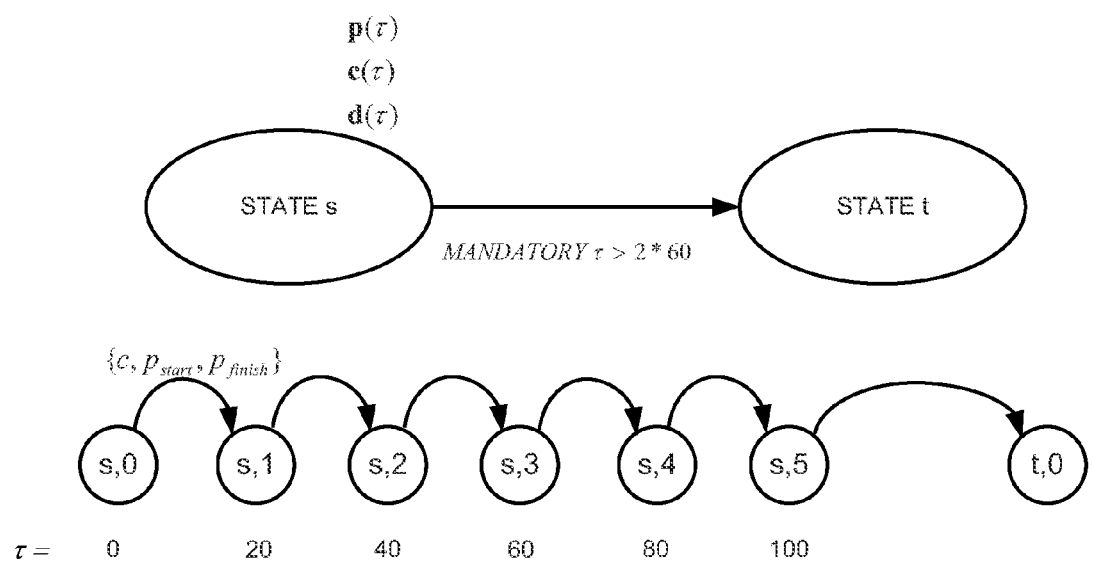
FIG. 5 presents a diagram illustrating an exemplary transformation from a model to a graph, in accordance with an embodiment of the present invention.

FIG. 5 presents a diagram illustrating an exemplary transformation from a model to a graph, in accordance with an embodiment of the present invention. The top portion of FIG. 5 shows a mandatory transition from a state s to a state t after two minutes, $\tau > 2*60$. The bottom portion of FIG. 5 shows the transformation to a graph using a time quantization of 20 seconds. As a result, the graph represents state s using 6 nodes, each corresponding to an additional dwell time of 20 seconds in the original state s.

Each edge in the graph is labeled with the cost of operation integrated over the time step. For example, the cost on the first edge in FIG. 5 is:

$$c = \int_{\tau=0}^{\delta t} c_s(\tau) d\tau. \quad (6)$$

Each edge on the graph is also labeled with two power levels, the power at the time represented by its source node ($p_{start}$) and the power at the time represented by its destination node ($p_{finish}$). In FIG. 5, the two power levels on the first edge in FIG. 5 are:

$$p_{start} = p_s(0)$$

$$p_{finish} = p_s(\delta t). \quad (7)$$

Note that the expansion shown in FIG. 5 is only necessary if there is a mandatory transition dependent on $\tau$, or the power $p_s(\tau)$ or cost $c_s(\tau)$ are not constant. A similar transformation is used for states that have mandatory transitions based on the deficit, D(t), and for states that change the deficit. Each state that changes the deficit is expanded into a sequence of states representing different quantized levels of deficit, using a similar process as the one shown in FIG. 5.

Figure 6:
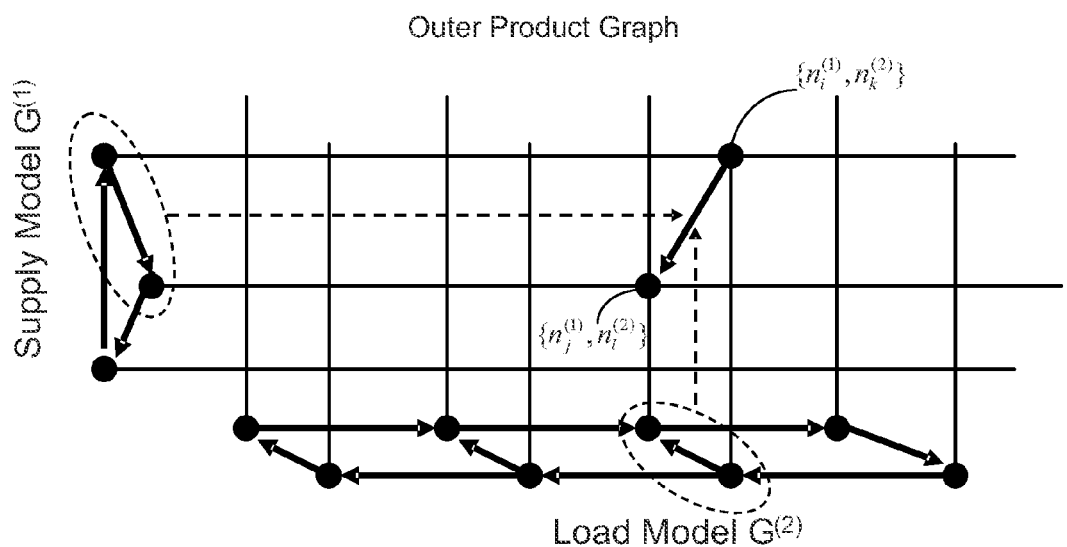
FIG. 6 presents a diagram illustrating the combination of two graphs, each representing a component, in accordance with an embodiment of the present invention.

The graphs that result from transforming the models for each component are not yet ready for shortest path computation. Note that a component performance model includes 3-tuple labels on each arc, such as the 3-tuple for the first edge shown in FIG. 5. For a system with multiple components, an additional "outer product" operation is used to combine the graphs representing the multiple components into a single graph. FIG. 6 presents a diagram illustrating the combination of two graphs, each representing a component, in accordance with an embodiment of the present invention.

FIG. 6 illustrates the combination of two graphs of two components, a supply $G^{(1)}=\{N^{(1)},E^{(1)}\}$, and a load $G^{(2)}=\{N^{(2)},E^{(2)}\}$ into a single graph. This is easiest to illustrate in two dimensions; the full optimization combines the graphs for all the components into a higher-dimensional outer product. In the outer product in FIG. 6, each pair of nodes, one from each graph (e.g., $n_i^{(1)} \in N^{(1)}$ and $n_k^{(2)} \in N^{(2)}$ becomes a single node labeled $\{n_i^{(1)}, n_k^{(2)}\}$ in the outer product (e.g., at the junctions where the horizontal and vertical lines cross in the figure). An edge appears in the outer product when there are edges between the corresponding nodes in the two projections, and the power is adequate (i.e., it is balanced or there is a surplus) at both the beginning and the end of these edges. For example, suppose that the first graph contains an edge with label $\{c^{(1)}=p_{start}^{(1)}, p_{finish}^{(1)}\}$ and the second graph contains an edge $e_{k,l}^{(2)}$ with label $\{c^{(2)}=p_{start}^{(2)}, p_{finish}^{(2)}\}$, and if the power is adequate at both the start and finish of these edges:

$$p_{start}^{(1)}+p_{start}^{(2)} \geq 0$$

$$p_{finish}^{(1)}+p_{finish}^{(2)} \geq 0. \quad (8)$$

Due to the linear power change along the edges, the power can be assumed to be adequate throughout the time step. An edge appears in the outer product graph between the nodes labeled $\{n_i^{(1)}, n_k^{(2)}\}$ and $\{n_j^{(1)}, n_l^{(2)}\}$, and the edge has a single scalar cost:

$$c^{(1)}+c^{(2)}. \quad (9)$$

In this way, the edge operator in the outer product reduces the 3-tuples on the edges in the component graphs to a scalar cost on the edges in the outer product graph.

The energy manager is primarily concerned with arranging adequate (i.e., more than enough) power. It is assumed that a sub-second regulation system (not described here) will actually balance the power exactly. For purposes of planning, when there is excess power, the cost terms from regulating supplies will be scaled back in Eq. (9), such as $\alpha c^{(1)}+c^{(2)}$, where $\alpha$ is the amount that supply 1 has been reduced to balance power. By doing so, the effects of regulation can be incorporated in the operand of the outer product.

If multiple component graphs are combined using an outer product, the resulting graph can have a large number of nodes (equal to the product of the number of nodes in the component graphs, $\|N^{(1)}\| \times \|N^{(2)}\| \times \|N^{(3)}\| \times \ldots$). Hence, instead of constructing the graph explicitly, the optimization process uses a search algorithm to find the shortest path through this graph. The algorithm enumerates only those nodes visited during the search.

The shortest path can now be computed from the outer product graph using an A* search algorithm. In an A* search, partial paths through the graph are queued according to a ranking function, f, defined as:

$$f(n)=g(n)+h(n), \quad (10)$$

where n is the last node on the partial path, g(n) is the cost of the partial path (i.e., from the start node s to n), and h(n) is a lower bound on all the unexplored paths from n to the terminal node t. In the current search problem, a lower bound h(n) can be computed by independently finding a shortest path through each of the load components' graphs, assuming no power constraints among components. These individual component shortest paths are computed to minimize cost, assuming that power is generated by the least costly supply. Therefore, these solutions lower bound the contribution of each component to the best shortest path in the outer product graph. These individual component graphs are small enough that all their shortest paths can be pre-computed for the time steps in the finite horizon (i.e., an "unrolled" graph can be computed), and the computation of h(n) becomes a simple look-up (and summation of the lower bounds) for each of the load component nodes in n. By queuing and processing nodes in the order of the smallest cost f(n), the A* algorithm insures that the first partial path to reach the terminal node t will be better than all the paths remaining on the queue and, thus, is the optimal path.

While the A* search is effective in greatly reducing the extent of the outer product graph that must be explored, there is no guarantee that it will find the optimal plan within the time step of the model predictive control (e.g., within 10-20 seconds). In one embodiment, if optimal is not possible, the search algorithm produces the best solution in the time available. This algorithm is sometimes referred to as "anytime" algorithm, meaning that it can at any time produce the best solution so far. However, only the best solution at the end of the time step is needed. Considerable research has been devoted to finding anytime variants of A*. In one approach that works well in an MPC application, an additional function a(n) is added to the ranking function (10) used to queue partial paths:

$$f(n)=g(n)+h(n)+a(n), \quad (11)$$

where the function a(n) depends on the length of the partial path to n:

$$a(n) = \begin{cases} 0 & \text{length}(n) \leq k \\ -\sigma(\text{length}(n)-k) & \text{length}(n) > k. \end{cases} \quad (12)$$

The function a(n) contains a flat region, for short partial paths, where the A* search will proceed as before, unmodified. However, once paths exceed length k, the downward slope of a(n) favors extending deeper paths, and the search will more closely resemble a depth-first search than an A* search. This will accelerate finding a solution, although it will not necessarily find the optimal solution.

The function a(n) works well with MPC. At the beginning of the optimization horizon, A* undertakes a careful search. However, toward the end of the optimization horizon, MPC artificially requires reducing the deficit to zero, so the search space includes states that are less likely to be actually visited by the controller. The a(n) function de-emphasizes the search in this latter portion of the graph.

An anytime algorithm is obtained by repeating the search with a sequence of variations of a(n) that vary the depth k and the slope $\sigma$. $a(n, k_1, \sigma_1), a(n,k_2,\sigma_2), \ldots$. First, a very shallow $k_1$ and steep $\sigma_1$ is used to comfortably obtain a solution within the time allowed. Then, subsequent searches can deepen the search until, time permitting, $k_1$ includes the entire optimization horizon and an optimal solution is found.

Mixed Integer Program (MIP) Solver

A different approach to solve the optimization problems expressed by Eqs. (4) and (5) uses a mixed integer program (MIP) solver. The hybrid system control problem can be translated into an MIP problem following approaches described in various publications, such as "Model Predictive Control" by Eduardo F. Camacho and Carlos Bordons, published by Springer-Verlag, London, 2007; and "Constrained Optimal Control and Predictive Control for Linear and Hybrid Systems" by F. Borrelli, A. Bemporad, and M. Morari, published by Springer-Verlag, London, 2010.

Before expressing the component performance models as stepped hybrid system, we first describe how the models are described in a commonly used language for hybrid automata. Each state and arc in the finite state machines described in previous sections translates 1:1 to states in a hybrid automaton.

Each state s becomes a state in the hybrid automaton with the following flow equations:

$$\dot{\tau}=1 \tag{13}$$

$$\dot{P}=p_s(\tau) \tag{14}$$

$$\dot{C}=c_s(\tau) \tag{15}$$

$$\dot{D}=d_s(\tau). \tag{16}$$

Every arc entering this state will have a reset operation $\tau:=0$, so Eq. (13) simply defines $\tau$ as the dwell time in the current state. The remaining equations (Eqs. (14)-(16)) integrate the linear functions defined in Eq. (1). For each arc $a_k$ leaving s on trigger condition $T_{r_k}$, we will include the negated trigger condition in the invariant equations for state s:

$$\bigwedge_k \neg T_{r_k}, \tag{17}$$

where a trigger condition is one of the following:

$$T_{r_k} \in \begin{cases} \tau \geq \tau_{max} \\ D(t) \geq D_{max} \\ D(t) \leq D_{min} \\ u(t) = \text{``option name''}. \end{cases} \tag{18}$$

Each arc $a_k=\{s_1,s_2,T_{r_k}\}$ becomes an arc in the hybrid automaton between the corresponding states $s_1$ and $s_2$, with guard condition $T_{r_k}$ and reset map $\tau:=0$.

In control applications, formalizations of hybrid automata often use stepped time rather than the continuous time formalization shown above in Eqs. (13)-(16). It is useful to use stepped time, and given the restriction that the rates of change be linear functions of $\tau$ (see Eq. (1)), it is straightforward to derive linear difference equations for the states in the hybrid automata.

A bold t is used to indicate time steps $t=0, 1, 2, 3, \ldots$. The continuous time t changes in discrete steps: $t=t\delta t$. For each of the linear functions in Eq. (1), two constants are computed as:

$$\alpha_s^p = p_{s,1}\frac{\delta t^2}{2} + p_{s,0}\delta t \tag{19}$$

$$\beta_s^p = p_{s,1}\delta t.$$

Note that the constants for cost ($\alpha_s^c, \beta_s^c$) and deficit ($\alpha_s^d, \beta_s^d$) are computed in a similar way.

The linear difference equations within each state s are expressed as:

$$\tau(t+1)=\tau(t)+\delta t$$

$$p(t+1)=p(t)+\beta_s^p\tau(t)+\alpha_s^p$$

$$c(t+1)=c(t)+\beta_s^c\tau(t)+\alpha_s^c$$

$$d(t+1)=d(t)+\beta_s^d\tau(t)+\alpha_s^d, \tag{20}$$

with a reset map for transitions between states that includes resets for the variable:

$$\tau:=0. \tag{21}$$

In addition, because the stepped time may "overshoot" the trigger conditions on the deficit, in cases where the trigger involves the deficit we also reset the deficit to the constant $D_{limit}$, (i.e., either $D_{min}$ or $D_{max}$) that was used in the trigger condition:

$$d:D_{limit} \tag{22}$$

Each discrete state is assigned its own 0-1 variable. For a state $s_i^{(j)}$, which is s state in the finite state model for component j ($s_i^{(j)} \in S^{(j)}$), the binary variables for this state at each time step are:

$$s_i^{(j)}(t) \in \{0,1\}. \tag{23}$$

At each time step, only one of these state variables will be 1:

$$\sum_i s_i^{(j)}(t) = 1, \tag{24}$$

that is, the finite machine will be in only one state. By introducing variables $x_{i,k}^{(j)}(t) \in \{0,1\}$ for each valid transition in the finite state machine, one can formulate the solution of the state variables as a flow problem:

$$s_k^{(j)}(t) = \sum_i x_{i,k}^{(j)}(t) \tag{25}$$

$$s_k^{(j)}(t) = \sum_i x_{k,i}^{(j)}(t+1).$$

We have chosen this encoding of the variables because our component performance models typically do not include many states or transitions, and these network flow constraints are easy to solve. It is possible to solve these constraints alone, relaxing the Boolean variables to continuous variables, using a linear program (LP) solver. Unfortunately, we introduce additional constraints that will require a full MIP solution.

The continuous dynamics in each state can be expressed with non-linear constraints that are selected according to the current state. For example, for the ECS model of FIG. 3A. the deficit can be computed according to:

$$d^{(ECS)}(t+1)=s_2^{(ECS)}(t)(d^{(ECS)}(t)+\Delta_2)+s_3^{(ECS)}(t)(d^{(ECS)}(t)+\Delta_3), \tag{26}$$

where the incremental and decremental constants are $\Delta_2=$ (bp−rp)e and $\Delta_3=$bp−cp. This constraint is not linear, but as long as the non-linear terms include only products of two variables, one of which is binary, then standard techniques can be used to reduce this constraint to linear constraints in the MIP formulation.

A similar approach, using the variables $x_{i,k}(t)$ as selectors, can be used to compute the reset conditions on the transitions.

Finally, we cross couple the component performance models with a power constraint at each time step:

$$\sum_j p^{(j)}(t) \geq 0. \tag{27}$$

This assures that there is adequate power. To balance the power exactly, we assume that one of the supplies is "regulating" and will reduce any excess output. Without loss of generality, we assume that component j=1 is the regulating supply, and introduce a new power variable $\tilde{p}$:

$$0 \leq \tilde{p}^{(1)}(t) \leq p^{(1)}(t). \tag{28}$$

The power constraint in Eq. (27) is now a strict power balance:

$$\tilde{p}^{(1)}(t) + \sum_{j \geq 2} p^{(j)}(t) = 0. \tag{29}$$

For the cost accounting to work properly, we also require that, for the regulating component j=1, the cost is a linear function of the power used:

$$c^{(1)}(t) = f(\tilde{p}^{(1)}(t)). \tag{30}$$

This way the cost is reduced when the power output is reduced. This is typically a consequence of lower fuel consumption. Note, however, that for this component cost is modeled less generally than what is possible for the other components.

System Hierarchy

There are two hierarchies related to the power system: the power-distribution hierarchy and the power-control hierarchy. These two hierarchies are highly correlated but still distinct.

To simplify the exposition, this disclosure has hitherto assumed that all loads and supplies were on the same bus. However, a typical aircraft often includes a hierarchy of buses, thus creating several technical challenges for energy management. First, there will be slight energy loss as power flows through transformers between buses. Second, while there will be some restrictions on power flow (e.g., no backward flow through an ACDC transformer), the energy-management system must predict the flows through the grid that will match supply with demand. Third, if there are any supplies (or loads) that are "regulating" their operation, that regulations must be incorporated in the solution of grid flows.

The simplest approach to multiple buses is to treat them as an equivalent single bus. This treatment is valid if: (1) the direction of flow is known for each transformer; (2) there are no flow limited connections between buses; (3) the power factor is near 1, and (4) currently connected portion of the grid is a tree structure. These are all reasonable assumptions for aircraft distribution grids. Although it is not uncommon for power to reverse through transformers when the aircraft is on ground power, it is still a predictable direction of power flow, and the above assumptions still hold while the aircraft is on ground power. The validity of the single bus transformation derives from the Thévenin equivalent. Note that a full justification is beyond the scope of this disclosure.

Figure 7:
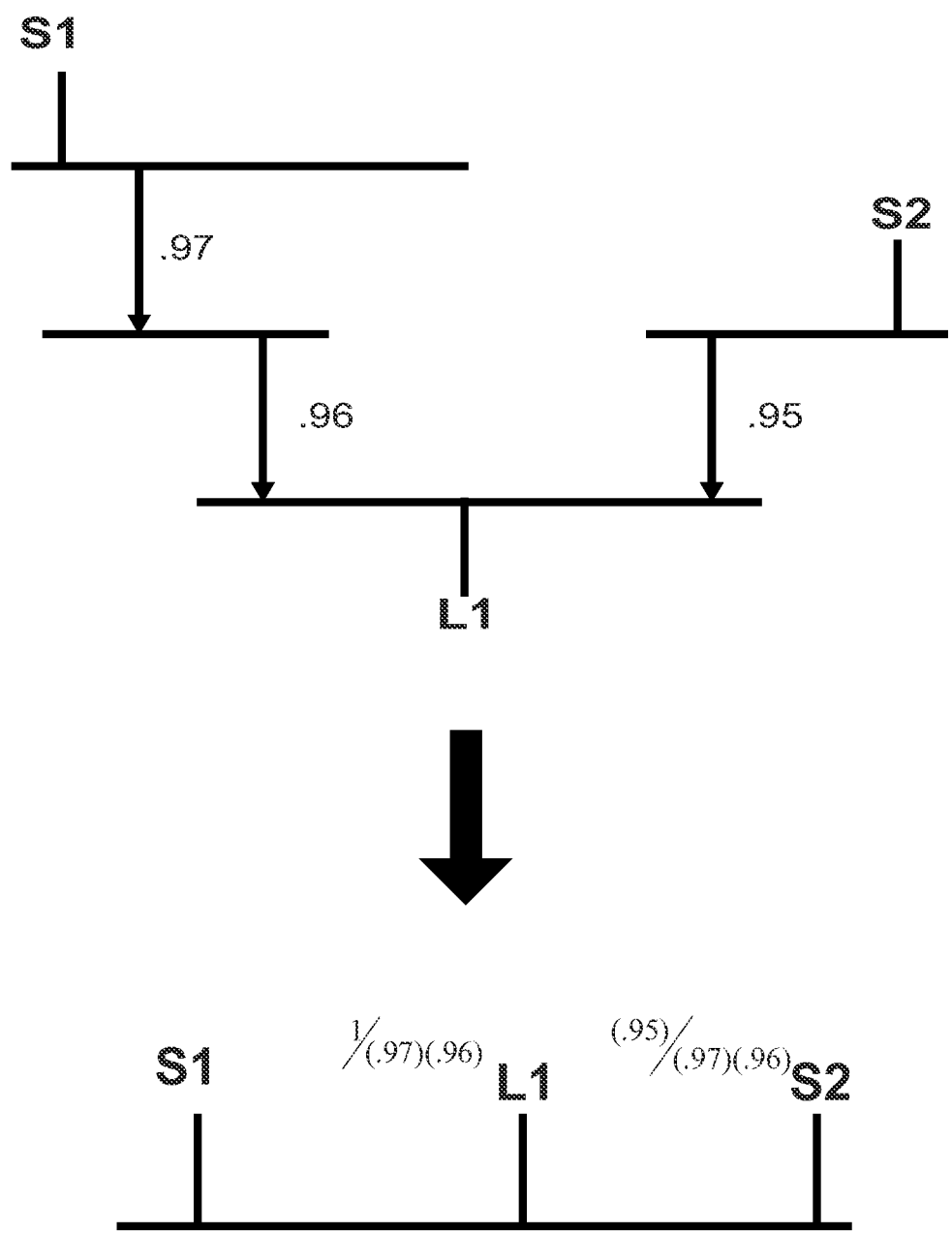
FIG. 7 presents a diagram illustrating a single bus equivalence of a hierarchy of buses, in accordance with an embodiment of the present invention.

FIG. 7 presents a diagram illustrating a single bus equivalence of a hierarchy of buses, in accordance with an embodiment of the present invention. The top portion of FIG. 7 shows a bus hierarchy, where two power supplies (S1 and S2) and a power load (L1) are coupled to different levels of buses. The decimals are efficiency factors of transformers between buses. The bottom portion of FIG. 7 shows the two supplies and the load are treated as if they were present on the same bus, provided that they are appropriately weighted. Their weights are determined by tracing a connective path from the load or supply to the reference bus. When the connective path crosses a transformer in the same direction as the power is flowing, the efficiency factor for the transformer is included in the numerator of the weight. When the connective path crosses a transformer in the opposite direction that the power is flowing, the efficiency factor for the transformer is included in the denominator. Note that power does not actually flow on the connective path; it is merely used as a computational device. All loads and supplies are mapped to the reference bus by computing their weights using their connective paths.

In the single bus equivalence approach, the optimization described in the previous section is modified by scaling the power variables by the weights computed for each load or supply.

Although the single bus equivalence is sufficient for most situations, a more complete approach can be useful to verify the single bus equivalence assumptions. This complete approach may also prove useful considering more unusual grid-like architectures (e.g., multiply connected grids) that are not currently used in aircraft. In the complete approach, grid flows are computed using a linear program. The grid is described using a graph, with nodes and connectors. Connectors can be wires, breakers, or transformers. The linear program solution, described in detail later, balances the power at every node of the graph, computes flows along all the connectors, and adjusts regulating supplies (or loads) to match supply with demand. The energy manager plans for more supply than demand, so the later step usually involves reducing the output of some of the regulating supplies.

Figure 8:
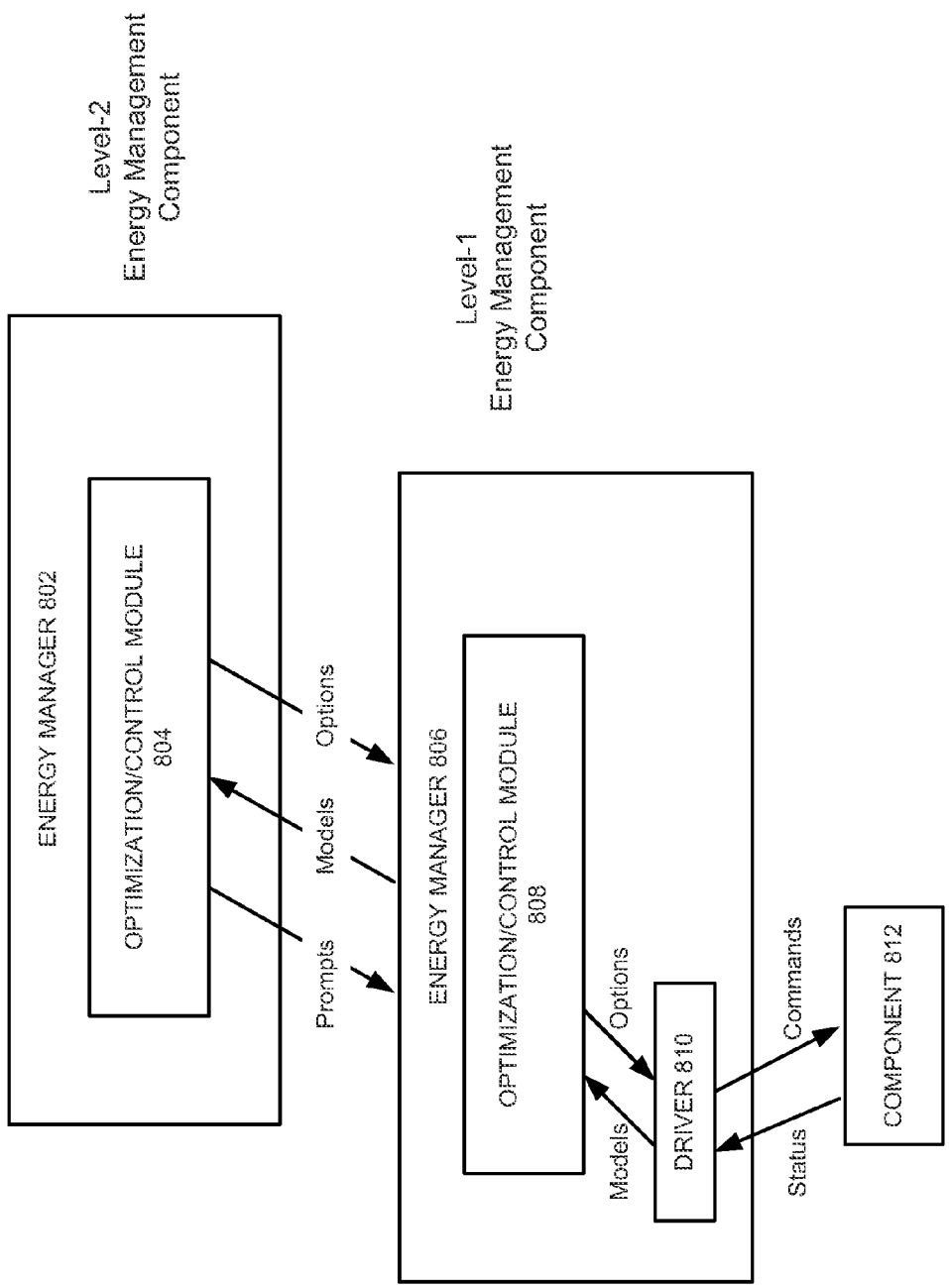
FIG. 8 presents a diagram illustrating an exemplary power-control hierarchy, in accordance with an embodiment of the present invention.

FIG. 8 presents a diagram illustrating an exemplary power-control hierarchy, in accordance with an embodiment of the present invention. Power-control hierarchy 800 includes two levels of energy-management components, energy managers 806 and 802 as level-1 and level-2 energy-management components, respectively. Energy manager 802 includes an optimization/control module 804. Energy manager 806 includes an optimization/control module 808 and a component driver 810, to which external component 812 is coupled.

The power-control hierarchy is distinct from the power-distribution hierarchy. The two hierarchies have similarities. For example, an energy-management subsystem for a galley would likely control loads on the same bus in the power-distribution hierarchy. However, it is not necessary to have a tight correlation between the two hierarchies. There can be multiple energy managers for different portions of a single bus, and an energy manager can control components on more than one bus.

The objective of using a hierarchy of energy managers is to reduce the computational load at the higher-level energy managers. An energy manager is able to combine the models of components by using an outer product to produce a single graph describing the joint operation of the components. In a hierarchy, such an outer product could be cascaded. For example, a lower-level (child) energy manager could compose an outer product, deliver it to a parent energy manager, and then the parent energy manager could further compose an outer product of the received outer products. Unfortunately, simply cascading the outer products in this way will not significantly reduce the computational load. In such a hierarchy, the same composed model (and therefore the same optimization challenge) would result as would have been composed by a single energy manager. Instead, it is desirable to have the child energy managers reduce the complexity of the models before they deliver them to their parents. To do so, the parent energy managers are configured to send what is referred to as "prompting" models to their child energy managers. These prompting models direct the child energy managers to compose aggregated simpler models. A child energy manager composes an aggregated model that includes only those options suggested in a prompting model (thereby hiding all the options present in its component performance models that would normally be reflected in the outer product graph). In the example shown in FIG. 8, optimization/control module 804 of parent energy manager 802 delivers a prompt model to optimization/control module 808 of child energy manager 806.

A prompting model suggests to the child energy manager that it creates certain optional modes of operation that achieve various power budgets. For example, this might include a mode that operates at a reduced power level for 4 minutes. The child energy manager uses planning and optimization of its lower level components to determine if the optional mode of operation is possible, and to determine the best way to deliver the optional mode of operation, if requested. The child energy manager, like a component driver, retains the responsibility for the detailed implementation of the optional mode of operation, and delivers a high-level summary of the consequences using the same uniform modeling language that drivers use to describe their components.

Figure 9A:
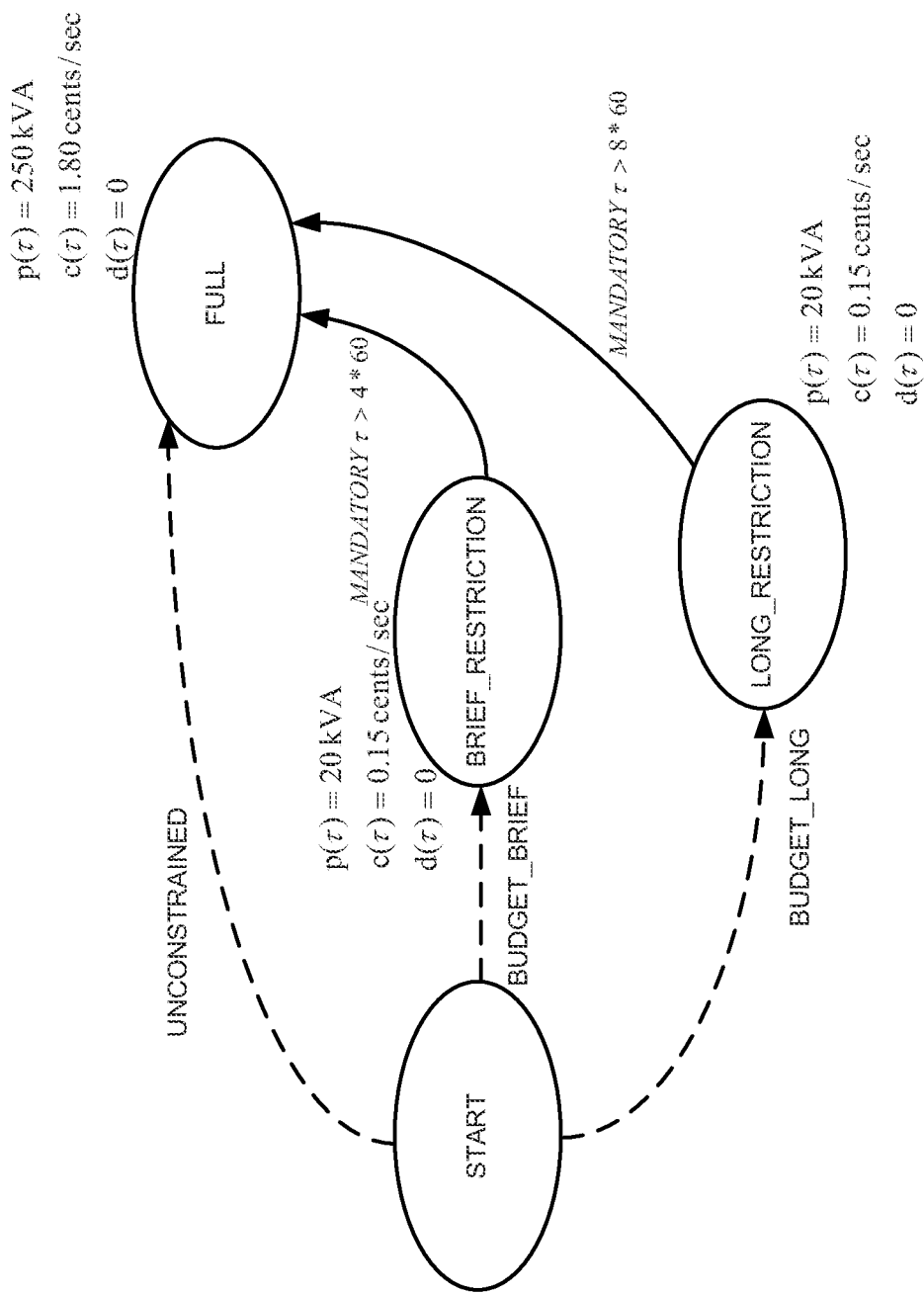
FIG. 9A presents a diagram illustrating an exemplary prompting model, in accordance with an embodiment of the present invention.

FIG. 9A presents a diagram illustrating an exemplary prompting model, in accordance with an embodiment of the present invention. This prompting model also uses the same uniform modeling language used to describe individual components, but their interpretation and use are different. The prompting model contains reference to a phantom component to suggest power budgets to the child energy manager. In FIG. 9A, the prompting model asks the child energy manager to compose a model with three optional modes of operation: "unconstrained," "budget brief (budget for 4 minuses)," and "budget long (budget for 8 minutes)." The model acts like a phantom supply; for example, on the "budget long" path the phantom supply delivers 20 kVA of power. This is asking the child energy manager to plan this mode of operation assuming that there is 20 kVA of power supplied elsewhere in the hierarchy. Note that the prompt is not a commitment by the parent energy manager to supply this power, just a request to create an option. Before the parent manager can invoke this option, it must have a plan to supply the power from elsewhere (i.e., from its other children). In some situations the prompting model may include phantom loads, in which case it is requesting optional modes that generate excess power.

While the prompting models use the same uniform modeling language as the other models in the system, they are interpreted differently. The optional arcs in a prompting model all emanate from the start node (although this requirement can be relaxed with additional pre-computation). In addition, the prompting model usually includes only a few optional arcs (for example, fewer than 5) to make what follows computationally efficient. The expectation is that the parent model will use heuristics, based on the current state and recent history, to limit the request to a few options that are potentially useful.

The child energy manager enumerates each of the options in the prompting model N, creating a sequence of prompting models $N_1, N_2, N_3, \ldots$, corresponding to options $o_1, o_2, o_3, \ldots$. Each prompting $N_i$ model consists of all arcs and nodes reachable through the initial optional arc $o_i$ in the original prompt. Each $N_i$ describes a phantom component with a single initial optional arc, which can be made mandatory, so $N_i$ contains no optional arcs. Each $N_i$ is separately composed with the child's other component performance models $M^{(1)}$, $M^{(2)}, M^{(3)}, \ldots$, and an optimal plan is computed according to MPC (this will reduce the deficit to zero at the end of the planning window). The optimal plan is denoted as: opt $(N_i \otimes \{M\}$. In other words, the operation of the child energy manager is tentatively optimized with an additional phantom component $N_i$.

Figure 9B:
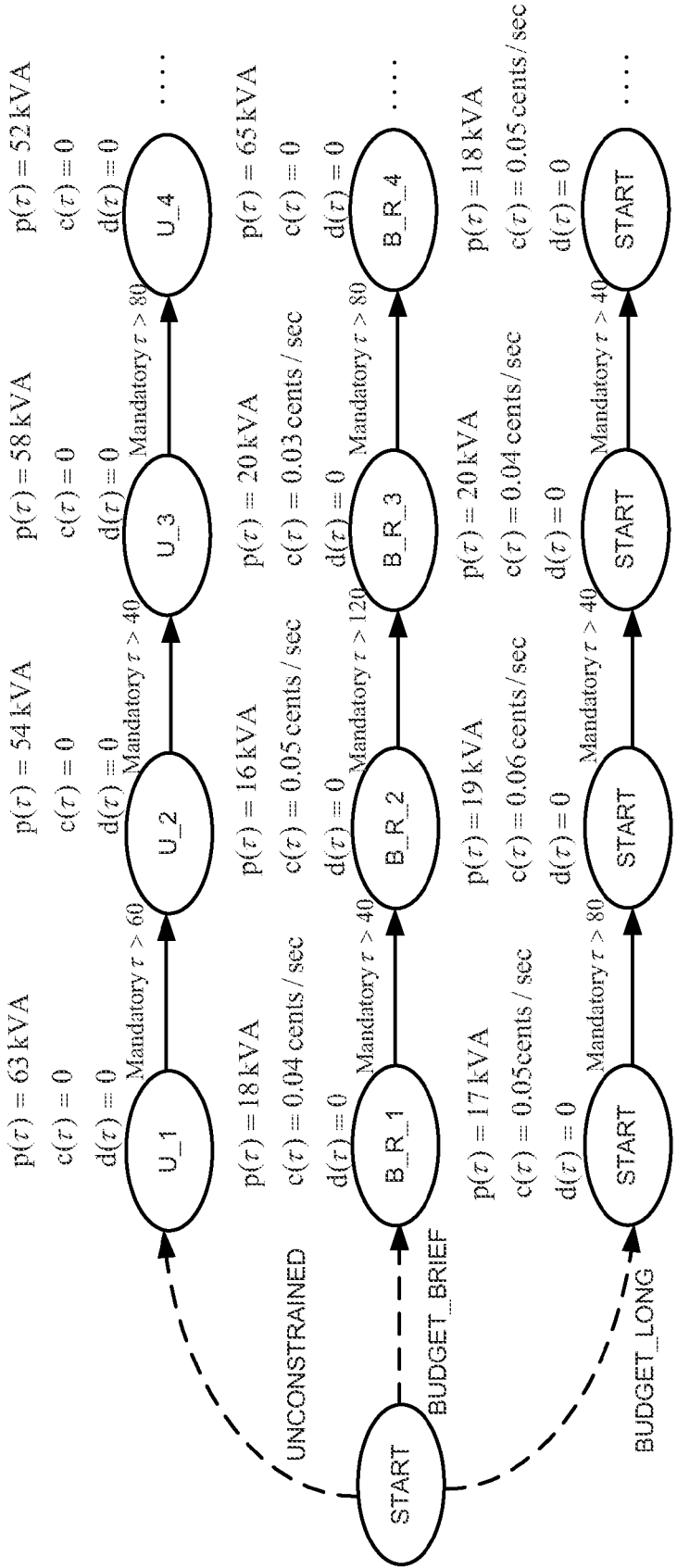
FIG. 9B presents a diagram illustrating an exemplary response model to the prompting model shown in FIG. 9A, in accordance with an embodiment of the present invention.

A child energy manager composes a summary model, which is referred to as a "response" model, and delivers it to the parent energy manager. The "response" model is similar to a performance model delivered by a driver for a component; it is a performance model for the aggregate of components (and possibly additional children) of the child energy manager. FIG. 9B presents a diagram illustrating an exemplary response model to the prompting model shown in FIG. 9A, in accordance with an embodiment of the present invention.

For each of the feasible plans, opt $(N_i \otimes \{M\}$, a summary path is generated. This is a non-branching sequence of states and arcs. The first arc is $o_i$ (the dashed lines in FIG. 9B). The states on this path contain power and cost functions that are the sum of the power and cost for all the components excluding the phantom component $N_i$. The additional arcs (the solid lines in FIG. 9B) on this path are mandatory (based on dwell time) and are inserted whenever opt $(N_i \otimes \{M\}$ includes a transition in any of its constituent components. The response model is assembled by hanging these paths off the start node as shown in FIG. 9B.

The "response" model resembles the "prompting model in that it has a similar multi-way optional branching at the first node. However, the remainder of the paths have been replaced with summary paths. This model is delivered to the parent energy manager. In other words, the child energy manager is "offering" the selectable modes that were requested in the prompting model. The parent energy manager can treat this model like any other model delivered by a driver, that is, the parent energy manager can use the same optimization techniques described in the previous sections to control its child energy managers. In fact, because of this uniformity of modeling, the parent energy manager can control a mixture of child energy managers and components.

Note that the "response" model contains all of the feasible options in the prompting model, but offers none of the options from the child energy manager's lower level components. This greatly reduces the computation load, but still offers some flexibility to the parent energy manager. If the parent energy manager selects option $o_i$, then the child energy manager implements this by selecting the options in opt $(N_i \otimes \{M\}$ and sending these options to its own lower level components.

The prompt-response protocol is considerably more powerful and flexible than a strict budget approach, where a parent energy manager would supply a budget to each child energy manager. In the above approach the parent energy manager, even after suggesting budgetary restrictions in a prompting model, still learns additional information in the response models. It may learn of additional savings beyond the request, and it will learn about the cost (e.g., the cost of demand response); this information will enable the parent energy manager to better optimize where the power reduction is achieved. For example, if a parent energy manager has offers from multiple children energy managers, it may choose the best source for demand response.

Regulation

The term "regulation" has multiple uses in power system engineering (e.g., "regulation ancillary services" and "regulating power supplies"). In this disclosure, this term refers to the control system on the aircraft that maintains power quality and balances supply with load on a short time scale (i.e., sub-second).

The energy-management system described in this disclosure is not primarily concerned with how power is regulated on the aircraft. Instead, the energy-management system is making demand response and power generation decisions on a larger time scale, such as 20 seconds and above. Moreover, the decisions are made to ensure that there is always "adequate" power, that is, more available supply than load. The regulation system provides a more precise balance of the supply and load at a finer time scale. Note that how the regulation is accomplished is largely independent of the energy-management system. Indeed, we believe that multiple possible approaches to regulation would be consistent with the energy-management system described in this disclosure. Although regulation and management function largely independently, there are a few points of interaction.

Note that the optimization may, at times, result in more than one power supply operating on the same bus. When balancing supply with demand, the regulation system may adjust both supplies proportionally, or it may favor adjusting one supply primarily to compensate for the imbalance. It may favor using a more expensive supply for balancing (i.e., using it only as needed), or it may favor using a supply because it can be adjusted more easily and quickly.

Regardless of how short-term regulation is accomplished, the long-term energy-management system benefits from knowing which power supplies (or loads) are able to regulate and their "flexibility rank" in regulation. The flexibility rank will indicate which supply (if there are several possible) is regulating to balance supply with demand; higher flexibility ranked supplies will act first. For this reason, the models delivered by the drivers include two additional parameters, a binary parameter indicating that the supply (or load) is regulating, and a flexibility rank for the supply (or load). The energy-management system uses these parameters in its optimization, to predict more precisely the cost of power generated and thereby more accurately plan energy-management strategies.

It may be that some of the supplies on the bus, based on more sophisticated power electronics and less physical restrictions on operation (e.g., fuel cells), may be able to act in several different modes with respect to regulation, that is, they can act as regulating or non-regulating supplies. When they are regulating they can adjust their "flexibility rank" to act either ahead of or behind other regulating supplies on the bus. While the overall architectural objective is to decouple, as much as possible, methods of regulation from long-term energy management, it may be beneficial for the information described in the preceding paragraph to flow in both directions. That is, rather than only having the supplies to advise the long-term energy-management system of their regulation parameters, it may also be beneficial for the long-term energy manager to suggest regulation behavior to the more sophisticated supplies, e.g., prescribing a flexibility rank to a more agile supply. The long-term energy manager has a more global perspective on the currently operating supplies and might, for example, suggest flexibility rankings so that higher marginal cost supplies are used more sparingly in matching supply with demand. The higher flexibility ranked supplies, i.e., supplies with a lower $f^{(j)}$, will be reduced first when matching supply with demand.

Figure 10A:
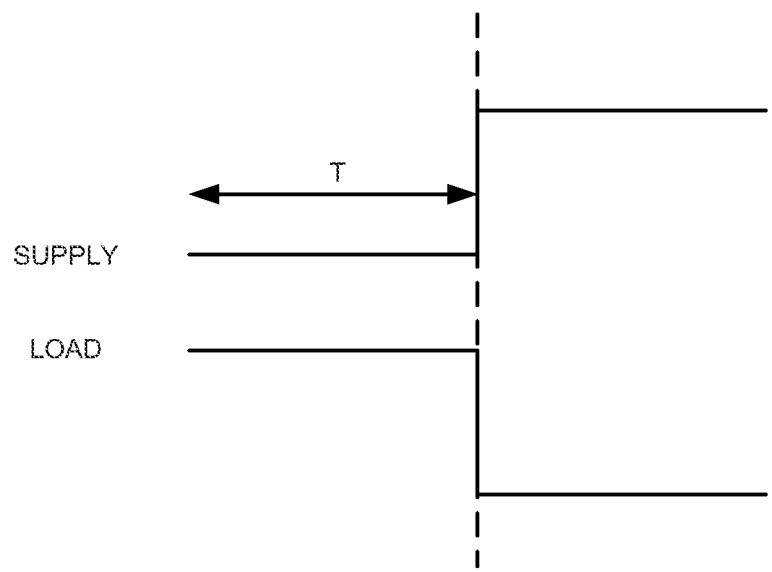
FIG. 10A presents a diagram illustrating power changes of a supply and a load in an ideal situation, in accordance with an embodiment of the present invention.
Figure 10B:
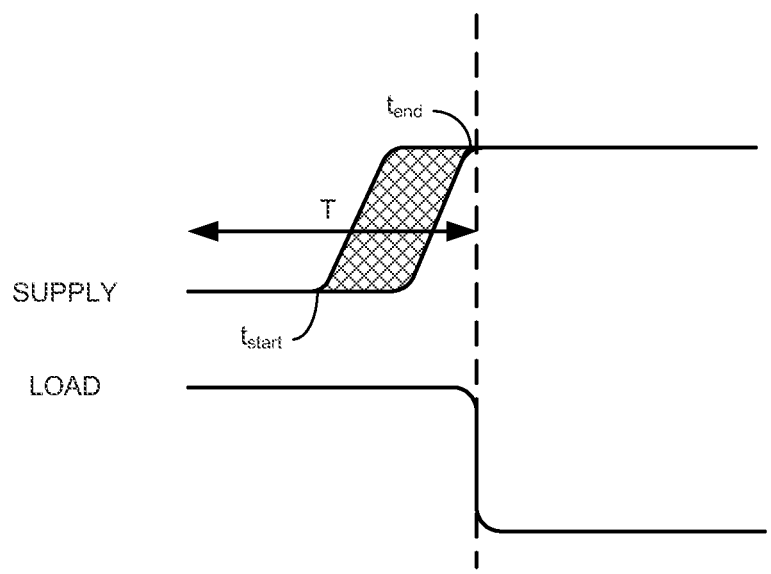
FIG. 10B presents a diagram illustrating power changes of a supply and a load in a practical situation, where there is some uncertainty in when the supply will generate power.

At the end of each planning period, such as every 20 seconds, the energy-management system determines a new action that may, at times, involve changing the active supplies and loads in the system. FIG. 10A presents a diagram illustrating power changes of a supply and a load in an ideal situation, in accordance with an embodiment of the present invention. At the end of the planning period, T, the supply is turned on to provide the power needed by the load. As one can see in FIG. 10A, the transitions occur instantly. However, in practice, due to various effects, it takes time for supplies and loads to complete their transitions. FIG. 10B presents a diagram illustrating power changes of a supply and a load in a practical situation, where there is some uncertainty in when the supply will generate power. As one can see in FIG. 10B, the power provided by the supply is ramped up to its desired value within a finite time duration. In addition, there are also uncertainties in terms of the times when the supply is turned on, as shown by the shaded area. This transition is on a sub-second scale, and a good regulation system should manage such a transition. However, there is some advantage in not stressing the regulation system unnecessarily. For example, to ensure that power is always adequate, the management system can turn on the supply before the load starts drawing power, as shown in FIG. 10B.

A "changing-of-the-guard" protocol is described here, which allows the energy-management system to coordinate any actions that it intends to be nearly simultaneous. For example, during operation, the energy-management system may issue a multiplicity of commands to components, such as requesting demand response from a load or requesting power generation from a supply. As discussed earlier, although simultaneous execution of all the commands are desired, the practical behavior or physical limitations of the components may not allow for such precise simultaneous execution. To reduce the disturbance of the real-time regulation of the power balance, in one embodiment, the energy-management system plans ahead slight modifications in the order of command execution (i.e., to allow some components to change their status before others). In one embodiment, the energy-management system feathers the execution of the commands to reduce the disturbance to the real-time power regulation.

The uniform modeling described above is extended by adding an additional transitional specification to each arc, consisting of two parameters, $t_{start}$ and $t_{finish}$, given in milliseconds. These parameters define a window in time (shown as the shaded area in FIG. 10B, after the transition is initiated, during which the power change will occur with high probability. The transition arcs will be under the control of their drivers; the energy manager computes a smoother "changing of the guard" schedule for the transition and delivers a set of small offsets (in milliseconds) for each changing component of the model. Note that this applies to both optional and mandatory transitions. The assumption is that for most of the mandatory transitions, such as the mandatory transition from "PAUSED" state 206 to "MUST_FINISH" state 208 after τ>2*60 shown in FIG. 2, there will still be slight latitude (e.g., a few hundred milliseconds) for the driver to execute such a transition.

There are several possible approaches to computing the offsets. One approach is to formulate the problem as an optimization, and minimize the difference between supply and load during the transition. However, such a formulation appears to be unnecessarily complex. Instead, we describe here two heuristic approaches which should considerably reduce the stress on the regulation system. Generally speaking, these approaches schedule additions to the power balance (e.g., more supply or demand response) before subtractions to the power balance.

When there is a window of uncertainty in when a transition will occur, a worst-case assumption means: additional demand will be early and additional supply will be late. More formally, during a transition, power for component j might be:

$$p^{(j)}(t - o^{(j)}) = \begin{cases} p^{(j)}_{old} & \text{if } t - o^{(j)} \leq t^{(j)}_{start} \\ \min(p^{(j)}_{old}, p^{(j)}_{new}) & \text{if } t^{(j)}_{start} \leq t - o^{(j)} < t^{(j)}_{finish} \\ p^{(j)}_{new} & \text{if } t^{(j)}_{finish} \leq t - o^{(j)}, \end{cases} \quad (31)$$

where, $o^{(j)}$ is the offset (in milliseconds) that determines when the transition is initiated. The goal is to find a set of offsets to reduce the stress on the regulation system. The power level $p_{old}^{(j)}$ is the power level that the energy manager chose for the previous interval and $p_{new}^{(j)}$ is the power level chosen for the next interval. Optimizing these choices is the primary role of the energy manager, as described earlier. These choices will have adequate power:

$$\sum_j p^{(j)}_{old} > 0, \text{ and} \quad (32)$$

$$\sum_j p^{(j)}_{new} > 0. \quad (33)$$

Here, we are only concerned with maintaining adequate power during the brief transition between the old and new intervals.

The long-term change in power for component j is defined as:

$$\Delta^{(j)} = p_{new}^{(j)} - p_{old}^{(j)}. \quad (34)$$

If $\Delta^{(j)} \geq 0$, then it is referred to as an additive transition; otherwise it is referred to as an subtractive transition. Examples of additive transitions might be adding a power supply or curtailing a load. For additive transitions, the worst-case transition is being late, at $t_{finish}^{(j)} + o_{(j)}$, while for subtractive transitions the worst-case transition is being early, at $t_{start}^{(k)} + o_{(k)}$. In one embodiment, the system uses a partial ordering to schedule transitions; a subtractive transition k is scheduled "after" an additive transition j, if their offsets are chosen so that:

$$t_{finish}^{(j)} + o^{(j)} < t_{start}^{(k)} + o^{(k)}. \quad (35)$$

In other words, the additive transition must finish before the subtractive transition can start.

One heuristic is to schedule all the additive transitions before all the subtractive transitions. This can be implemented by choosing a time $t_{middle}$ and setting all the additive offsets to:

$$o^{(j)} = t_{middle} - t_{finish}^{(j)}, \quad (36)$$

and all the subtractive offsets to:

$$o^{(k)} = t_{middle} - t_{start}^{(k)}. \quad (37)$$

Such a setting of offsets will insure that all the additions will be completed before the subtractions, so that there won't be a shortage of power during the transition. However, there may be excess power before $t_{middle}$. We can further "feather" this transition.

We specify additional ordering relations useful for feathering; any kind of transition k (either additive or subtractive) will be considered scheduled "after" any other kind of transition j if their offsets obey the same relationship as in Eq. (35) (this is somewhat counterintuitive, because Eq. (35) refers to subtractive after additive, but it will prove useful to order all kinds this way). We can describe another heuristic scheduler. A partial order is created as follows:

1. All "regulating" subtractions are identified and collected in a terminal group, designated $g_{-1}$.
2. All "regulating" additions become the phase 0 group, designated $g_o$. We begin a cumulative power balance calculation by setting $B_0$ to the sum on the left hand side of Eq. (32) and then computing $B_1$ by adding the sum of the deltas (see Eq. (34)) for the elements of $g_0$ to the power balance $B_0$. The unassigned pool is initialized with the remaining non-regulating components.
3. In the odd phases we select a set of subtractions from the unassigned pool. A greedy algorithm is used, starting with the largest unassigned subtraction and proceeding to the smaller subtractions, including subtractions in group $g_{2i-1}$ as long as the cumulative power balance is still greater than zero. The elements in $g_{2i-1}$ are ordered after the elements in $g_{2i-2}$ are in the partial order, thus staggering the subtraction and additional transitions.
4. In the even phases we select the single largest addition in an unassigned pool, and make that $g_{2i}$. The element in this singleton group is ordered after the elements in $g_{2i-1}$ are in the partial order.
5. Steps 3 and 4 are repeated until the unassigned pool is exhausted; then the elements in $g_{-1}$ are ordered after the last group constructed.

The partial order can be turned into an embedded temporal order as follows. We initialize the current schedule time, $t_{sweep}=0$, and the current group index, $i=0$. All the offsets for components in the group $g_i$ are set so that:

$$o^{(j)} = t_{sweep} - t_{start}^{(j)}. \quad (38)$$

Then, the current schedule time $t_{sweep}$ is advanced far enough to allow all the transitions in the current group $g_i$ to complete:

$$t_{sweep} = \max_{j \in g_i}(o^{(j)} + t_{finish}^{(j)}). \quad (39)$$

The process is repeated for all the subsequent groups ($i \leftarrow i+1$).

Figure 11:
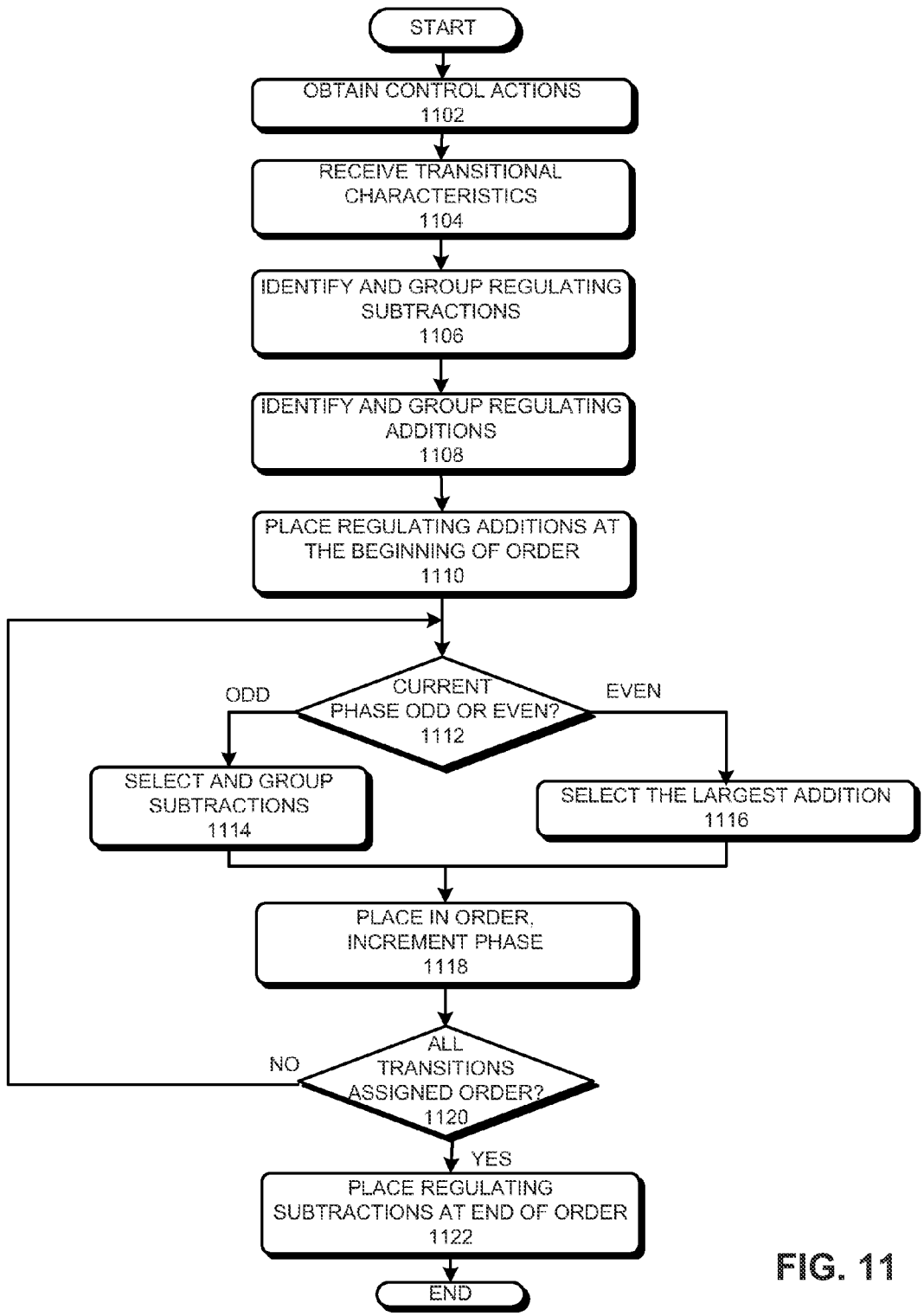
FIG. 11 presents a flowchart illustrating the process of scheduling transitions for various components, in accordance with an embodiment of the present invention.

FIG. 11 presents a flowchart illustrating the process of scheduling transitions for various components, in accordance with an embodiment of the present invention. During operation, the system obtains a number of control actions at the end of a planning period (operation 1102). The control actions are obtained by performing an optimization. In one embodiment, the control actions include, but are not limited to: demand response action of a load, activation of alternative energy sources (such as fuel cells), charging and discharging of energy storage devices (such as supercapacitors).

The system receives transitional characteristics from components associated with the control actions (operation 1104). In one embodiment, these transitional characteristics may be supplied by the component drivers, before the optimization is performed and the control actions are selected. A driver may supply transitional characteristics for all the actions of the component, or it may supply transitional characteristics for specific control actions in the performance model delivered to the optimizer. Once the optimization and control has selected the control actions, the associated transitional characteristics received from the driver are provided for the scheduling. The transitional characteristics describe the transitional properties of a component. In one embodiment, the transitional characteristics include, but are not limited to: the amount of power that is changed before and after the transition; a duration time constant that describes how rapidly a component can start a transition, e.g., turn on or turn off; an accuracy figure that describes how accurately a component can transition; and a component's ability to feather a transition. Note that a transition here refers to the status change of a component between "on," "off," or other modes of operations.

The system identifies transitions that are "regulating" subtractions, and groups these transitions (operation 1106), and then identifies and groups transitions that are "regulating" additions (operation 1108). The system places "regulating" additive transitions at the beginning (as initial phase 0) of the order of the transitions (operation 1110).

The system determines whether the current phase is an odd phase or an even phase (operation 1112). If the current phase is an odd phase, the system selects and group subtractive transitions from the remaining non-regulating components, starting from the largest subtractive transition and proceeding to smaller ones in order, as long as the cumulative power balance is greater than zero (operation 1114). If the current phase is an even phase, the system selects a largest additive transition (in terms of amount of the energy change) from the unassigned components (operation 1116). The selected transitions are placed in order behind transitions selected in a previous phase, and the phase is incremented (operation 1118).

The system then determines whether all transitions have been assigned an order (operation 1120). If not, the system returns to operation 1112. If so, the system places the "regulating" subtractive transitions at the end of the order (operation 1122). Note that after all transitions are placed in order, the system can generate offsets for the control actions associated with the transitions. Transitions placed in the front of the order are given smaller offsets, whereas the ones at the end of the order are given larger offsets. The time delay between two consecutive executions (the difference in the offsets) can be determined based on the transitional characteristics of the components. For example, if a supply takes a relatively longer time to ramp up its power, the system will not turn on the load, which depends on this extra power to operate, before the supply has reached its full power. Or, the system can feather the turn on process of the load by extending its ramp up time, thus making sure that the amount of power drawn by the load is less than that produced by the supply at any time. Compared to the planning period, executions of these control actions are happening within a very brief time interval, such as on the sub-second time scale.

This second heuristic maintains the maximum amount of regulation capacity through the transition. In addition, by selecting additions and subtractions in alternating phases, the system further staggers the addition and subtraction of non-regulating components to prevent negative power excursions and reduce positive power excursions.

Grid Flow Solution

In most cases, when the directions of the grid power flows are known, and form a tree structure, the single bus equivalence approach, described above, can be used for energy optimization. However, in some cases it will be useful to solve for the power flows in the grid. This allows for verification of flow directions and flow limitations. This section describes how grid power flows are computed using a linear program. It is not a full power grid flow solution, but rather assumes a power factor of one, and solves for energy balance throughout the grid. Note that these assumptions are reasonable for the more carefully regulated power systems in aircraft. The grid is described using a graph, with nodes and connectors. Connectors can be wires, breakers, or transformers. A single bus might be represented as several nodes connected with wires, while the bus might be connected to other buses with a transformer. The components (loads or supplies) are located at nodes. These are the problem size parameters:

$n$ number of nodes $m$ number of components.

$q$ number of connectors $\quad (40)$

In the earlier notation, the power contribution from component j at time t was denoted:

$$p_{i^{(j)}(t)}^{(j)}(\tau(i^{(j)}(t),t)), \quad (41)$$

where $i^{(j)}(t)$ was the state of the component's finite state machine at time t, and $\tau$ was the dwell time in that state. This section uses a shortened notation:

$p^{(j)}(t)$power($-$load)($+$supply)of component $j=1,2,\ldots,m,$ $\quad (42)$ which is the power contribution of component j at time t. We will use the terminology "given" for the power, since it is treated as a constant for the solution of the grid flow.

The variables are:

$a^{(j)}(t)$regulation of component $j, a^{(j)}(t) \epsilon [0,1]$ $b_i(t)$balance at node $i=1,2,\ldots,n$ $d_{kl}(t)$power flowing from node $k$ to node $l$. $\quad (43)$ Note that while $p^{(j)}(t)$ is given, if the component is regulating (i.e., dynamically adjusting its load or supply), this will be reflected by an $a^{(j)}(t)$ variable in the range [0, 1], so that the actual power contribution of the component will be:

$$a^{(j)}(t)p^{(j)}(t). \quad (44)$$

The above variables are shown as functions of time t. We will solve the optimization in a discrete set of time steps. Linearity between time steps allows this treatment.

In addition to the power $p^{(j)}(t)$ of the components, the following are also treated as givens (i.e., constants) for the flow solution:

$f^{(j)}$ flexibility of component $j$(if regulating),$f^{(j)}1=,$ $2,\ldots$ $e_{kl}$ efficiency of transmission on connector from $k$ to $l$, $e_{kl} \epsilon [0,1)$. $\quad (45)$ The following can be derived from the variables and givens:

$a^{(j)}(t)p^{(j)}(t)$actual power generated(or drawn)by component $j$ $d_{kl}(t)e_{kl}$ power arriving at node $l$ from node $k$ (after efficiency loss). $\quad (46)$ The central constraint for the solution of the grid flow is the power balance at each node:

$b_i(t)=0$ balance at node $i=1,2,\ldots,n.$ $\quad (47)$

We constrain the power flow variables to be positive:

$d_{kl}(t) \geq 0,$ $\quad (48)$ but for most connectors (e.g., wires, AC-AC transformers), there are variables for both directions, $d_{kl}(t)$ and $d_{lk}(t)$, so power can flow in either direction. Some connector specifications may prohibit flows in one direction or the other (e.g., an AC-DC transformer). By bounding the efficiency $e_{kl}$ away from 1 (using 0.999 for wires), the circular flows should be suboptimal in the optimization problem below. Only one of these variables will be strictly positive (i.e., there will be no unrealistic circular flows in the mathematical solution for the connector).

If a component is regulating, then its $a^{(j)}(t)$ will be allowed to vary; otherwise, it is fixed at 1:

$0 \le a^{(j)}(t) \le 1$ for regulating supply or load $j$ $a^{(j)}(t) = 1$ for fixed supply or load $j$. (49)

For convenience, for fixed components we define the flexibility to be zero, i.e., $f^{(j)} = 0$. If there is not an adequate amount of regulating capacity (that is, if there is not enough flexibility), then it may not be possible to balance the power at each node. The solution will be infeasible, or excess power will be mathematically dissipated with circular flows in the connectors (both of these failures can be verified).

The balance at node i can be expanded to the following constraint:

$$b_i(t) = -\sum_l d_{il} + \sum_k d_{ki} e_{ki} + \sum_{j \text{ at node } i} a^{(j)}(t) p^{(j)}(t) = 0. \quad (50)$$

The objective is to minimize the "flexibility weighted" amount of power required to balance the power at all nodes:

$$-\sum_j R^{-f(j)} a^{(j)}(t) p^{(j)}(t). \quad (51)$$

The constant R must be greater than the inverse of the worst (smallest) end-to-end efficiency factor for the above objective to cascade properly (e.g., R=10). With such an R, the higher flexibility regulating supplies (i.e., supplies with a smaller $f^{(j)}$) will be reduced first because they make a larger contribution to the above formula. The flexibility weighting in the above objective, Eq. (51), is a mathematical device that has no physical interpretation; it simply insures that the higher flexibility supplies are adjusted (reduced) first. Generally speaking, it would be better if the supplies with higher marginal cost of power generation would also have higher flexibility for reduction. However, the flexibility may also need to reflect that certain supplies will respond more quickly to imbalance. The energy manager is not directly responsible for regulation; these flexibility rankings simply reflect the operation of the regulation, and allow the energy manager to predict and plan for the consequences of regulation.

Eq. (51) is useful to coordinate regulating loads when solving for grid flows. It allows for grid flows to be computed efficiently with a linear programming problem. The power $p^{(j)}(t)$ for each component is assumed to be given. This solution may be used to verify the assumptions (e.g. flow direction) in the single bus equivalence described above. Moreover, if we are solving the optimization problem using MIP, we can modify this linear program to provide a grid flow solution that balances power and cross-links the component performance models. In the MIP optimization we cannot include an objective like Eq. (51) since the overall objective is to minimize the cost of energy generated and disutility incurred. Moreover, the power variables $p^{(j)}(t)$ are no longer givens, but part of the optimization, so the balance equation, Eq. (50), is non-linear. We need a slightly different approach to grid flow computation for the energy-management optimization variation using MIP.

However, since we are already using MIP to solve the optimization, we can handle the different flexibility rank of supplies with a selector construct. Let $w^{(j)}$ be an integer 0-1 variable that is 1 if component j is actively regulating. Then, for example, we can establish a strict flexibility order by adding these constraints:

$$w^{(j)}(t) \in \{0, 1\} \quad (52)$$

$$\sum_{j \text{ regulating}} w^{(j)}(t) \le 1.$$

Eq. (52) ensures that only one component is actively regulating. We define additional helper variables:

$$w^{+(j)}(t) = \sum_{k \text{ regulating}, f^{(k)} > f^{(j)}} w^{(k)}(t) \quad (53)$$

$$w^{-(j)}(t) = \sum_{k \text{ regulating}, f^{(k)} < f^{(j)}} w^{(k)}(t).$$

And we introduce new, flexible power $\tilde{p}$ variables for each of the regulating components and constrain them:

$$w^{+(j)}(t) p^{(j)}(t) \le \tilde{p}^{(j)}(t) \le (1 - w^{-(j)}(t)) p^{(j)}(t) \quad (54)$$

Now, the new grid balance is linear in the $\tilde{p}$ variables:

$$b_i(t) = -\sum_l d_{il} + \sum_k d_{ki}(t) e_{ki} + \sum_{j \text{ at node } i} \tilde{p}^{(j)}(t) = 0. \quad (55)$$

So, this can be used as a cross coupling constraint in the MIP formulation.

The constraint in Eq. (54), one for each $\tilde{p}^{(j)}(t)$, allows only one supply to be actively regulating. This is appropriate if all the supplies are on the same bus, or well connected through transformers. For not so well-connected grids, either more structured constraints or separate optimization problems must be used to allow multiple actively regulating supplies to address balance in different parts of the grid.

Figure 12:
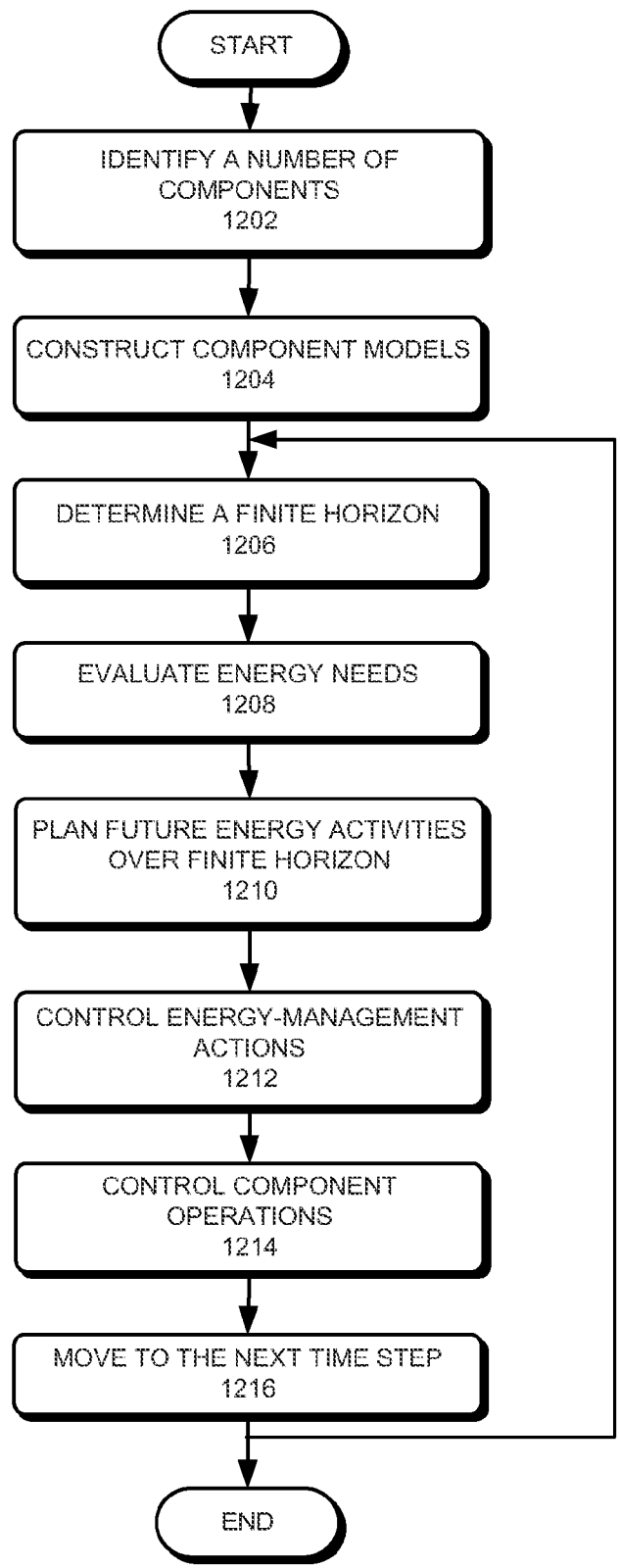
FIG. 12 presents a flowchart illustrating an exemplary process of energy-management planning, in accordance with an embodiment of the present invention.

FIG. 12 presents a flowchart illustrating an exemplary process of energy-management planning, in accordance with an embodiment of the present invention. During operation, the system identifies a number of components that are "online" (operation 1202). The components can either be power supply or load. Being "online" means the system can control the operation of the component. The system constructs a model for each component (operation 1204). In one embodiment, a component performance model is constructed by the corresponding component driver. The model is in the form of a finite state machine, and each state is defined by a number of variables. In one embodiment, the state variables include power, cost, and deficit for the component.

The system determines a finite time horizon (operation 1206), and evaluates energy needs over the finite time horizon (operation 1208). For example, if it is determined that the aircraft is experiencing heavy icing, the system determines that extra amount of energy will be needed by the wing ice protection system for the anti-icing effort. The finite time horizon is in the range of tens of minutes. The system then plans future energy activities based on the current status of the component and future energy needs (operation 1210). Note that here the energy activities include either or both energy consumption (by the load) and energy generation (by the power supply). For example, in the heavy icing scenario, the system may determine that the power supplies (including the generators, the fuel cells, and the supercapacitors) need to provide a certain amount of extra energy, whereas the loads (including the oven, the ECS, etc.) need to reduce their energy use by a certain amount. In one embodiment, the system makes an optimal energy-activity plan using the component performance model provided by individual component drivers. In a further embodiment, the system finds the optimal solution by minimizing the total cost (over all components) subject to a number of constraints, including the adequate power constraint, the zero deficit constraint, the feasible path (through the finite state machine) constraint, and the constraint set by the initial conditions. In a further embodiment, the optimization problem is solved using an A* search algorithm. The time step used in the optimization is in the range of tens of seconds. In one embodiment, the time step is 20 seconds.

The system then uses the planned energy activities to control its energy-management actions (operation 1212). In one embodiment, the energy-management actions include, but are not limited to: demand response of a load and activation of a supply (including energy generation and storage). The system controls the operations of the components using the first time step of the optimized energy-activity solution (operation 1214). The system then moves to the next time step (operation 1216), and returns to operation 1206.

Computer and Communication System

Figure 13:
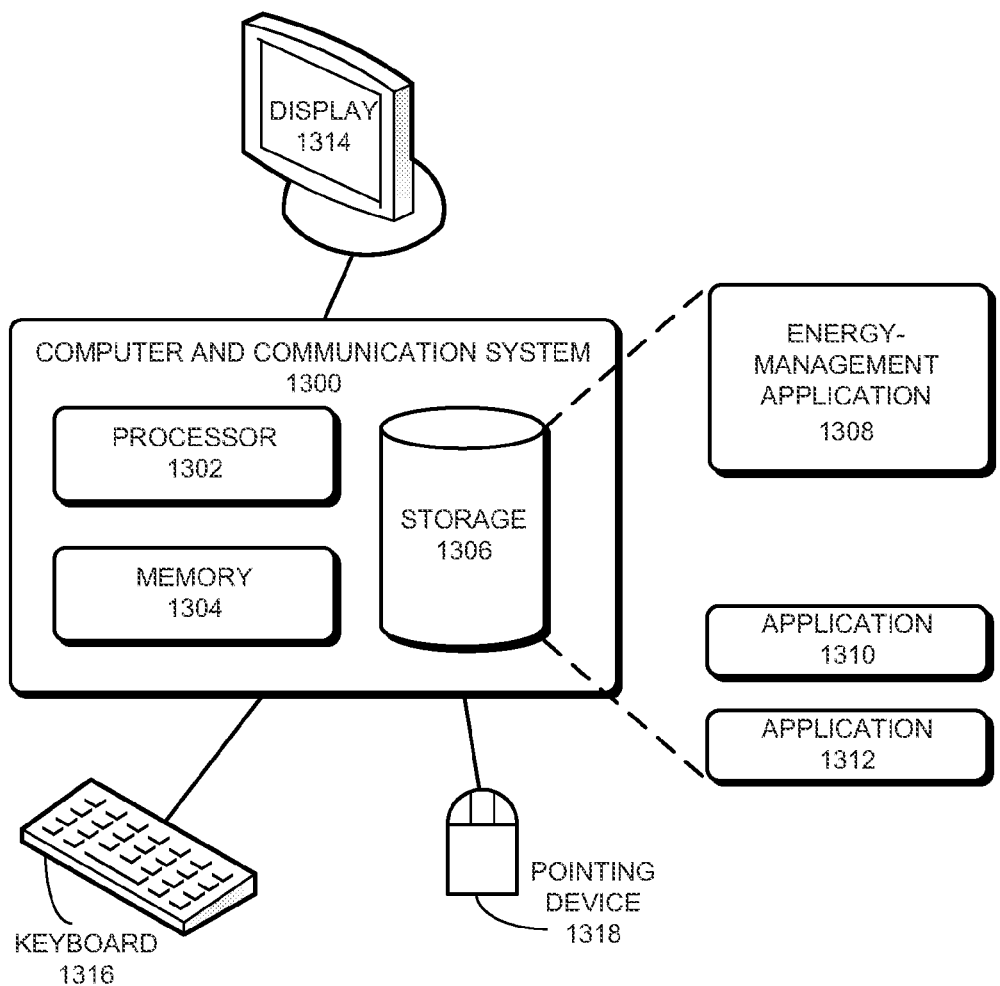
FIG. 13 presents an exemplary computer system for facilitating implementation of a linked control system, in accordance with an embodiment of the present invention.

FIG. 13 presents an exemplary computer system for facilitating implementation of a linked control system, in accordance with an embodiment of the present invention. In FIG. 13, a computer and communication system 1300 includes a processor 1302, a memory 1304, and a storage device 1306. Storage device 1306 stores programs to be executed by processor 1302. Specifically, storage device 1306 stores an energy-management application 1308, as well as other applications, such as applications 1310 and 1312. During operation, energy-management application 1308 is loaded from storage device 1306 into memory 1304 and then executed by processor 1302. While executing the program, processor 1302 performs the aforementioned functions. In a further embodiment, the energy-management application may be implemented on multiple computer systems, for example, with the driver portion of the energy-management system executed on one computer and communicating models to another computer where the optimization and control are executed. In one embodiment, the driver may be executed on a computer that also functions as an embedded controller in a component. When there are hierarchical energy managers, the parent and children may reside on separate computers, communicating prompts, models, and control options between the computers. Computer and communication system 1300 is coupled to an optional display 1314, keyboard 1316, and pointing device 1318.

Note that although this disclosure uses an aircraft electrical system as an example, the energy-management techniques can also apply to other closed or predominantly closed power systems, such as ships, spacecraft, military bases, buildings with their own distributed power generation, or micro grids. The term "predominantly closed" means that all the loads and supplies are within an electrically isolated system, or if there are external connections (such as ground power connections for an aircraft or power grid connections for a military base), these external connections are not disruptive enough to prevent managing a local set of critical loads and supplies to stabilize and reduce peak power in the system. In other words, the impact of the external connections is negligible on the energy-management system.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for managing energy within a predominantly closed power system, comprising:
  obtaining one or more control actions that control energy transitions of a plurality of components;
  receiving transitional characteristics associated with the energy transitions;
  identifying, based on the transitional characteristics of the energy transition, one or more additive energy transitions and one or more subtractive energy transitions; and
  scheduling the energy transitions by generating a set of offsets, wherein a respective offset involves delaying at least one energy transition, and wherein scheduling the energy transitions involves one of:
    scheduling all additive energy transitions ahead of all subtractive energy transitions; and
    staggering a number of subtractive energy transitions between consecutive additive energy transitions.

2. The method of claim 1, wherein the transitional characteristics associated with a transition include at least one of:
  amount of power change;
  a duration time constant;
  an accuracy figure; and
  a feathering capability.

3. The method of claim 1, wherein obtaining the control actions involves performing an optimization based on performance models associated with the components.

4. The method of claim 1, wherein the control actions include at least one of:
  demand response of a load;
  activation of a source; and
  energy withdrawal from a storage.

5. The method of claim 1, further comprising feathering an energy transition.

6. An energy-management system for managing energy within a predominantly closed power system, comprising:
  a control-action obtaining mechanism configured to obtain one or more control actions that control energy transitions of a plurality of components;
  a receiving mechanism configured to receive transitional characteristics associated with the energy transitions;

an identification mechanism configured to identify, based on the transitional characteristics of the energy transition, one or more additive energy transitions and one or more subtractive energy transitions; and a scheduling mechanism configured to schedule the energy transitions by generating a set of offsets, wherein a respective offset involves delaying at least one energy transition, and wherein while scheduling the energy transitions, the scheduling mechanism is configured to perform one of:

scheduling all additive energy transitions ahead of all subtractive energy transitions; and staggering a number of subtractive energy transitions between consecutive additive energy transitions.

7. The energy-management system of claim 6, wherein the transitional characteristics associated with a transition include at least one of:
amount of power change;
a duration time constant;
an accuracy figure; and
a feathering capability.

8. The energy-management system of claim 6, wherein while obtaining the control actions, the control-action obtaining mechanism is configured to perform an optimization based on performance models associated with the components.

9. The energy-management system of claim 6, wherein the control actions include at least one of:
demand response of a load;
activation of a source; and
energy withdrawal from a storage.

10. The energy-management system of claim 6, further comprising a feathering mechanism configured to feather an energy transition.

11. A non-transitory, computer-readable storage medium storing instructions that when executed by a computer cause the computer to perform a method for managing energy within a predominantly closed power system, the method comprising:

obtaining one or more control actions that control energy transitions of a plurality of components;

receiving transitional characteristics associated with the components;

identifying, based on the transitional characteristics of the energy transition, one or more additive energy transitions and one or subtractive energy transitions; and scheduling the energy transitions by generating a set of offsets, wherein a respective offset involves delaying at least one energy transition, and wherein scheduling the energy transitions involves one of:

scheduling all additive energy transitions ahead of all subtractive energy transitions; and staggering a number of subtractive energy transitions between consecutive additive energy transitions.

12. The computer-readable storage medium of claim 11, wherein the transitional characteristics associated with a transition include at least one of: amount of power change;
a duration time constant;
an accuracy figure; and
a feathering capability.

13. The computer-readable storage medium of claim 11, wherein obtaining the control actions involves performing an optimization based on performance models associated with the components.

14. The computer-readable storage medium of claim 11, wherein the control actions include at least one of:
demand response of a load;
activation of a source; and
energy withdrawal from a storage.

15. The computer-readable storage medium of claim 11, wherein the method further comprises feathering an energy transition.

* * * * *